United States Patent
Williams et al.

(10) Patent No.: US 12,243,677 B2
(45) Date of Patent: Mar. 4, 2025

(54) ELECTRICAL POWER TRANSFORMER AND ELECTRICAL POWER TRANSFORMATION SYSTEM

(71) Applicant: IONATE LIMITED, Edinburgh (GB)

(72) Inventors: Matthew Williams, Edinburgh (GB); Seyed Ali Mousavi, Edinburgh (GB)

(73) Assignee: IONATE LIMITED, Edinburgh (GB)

(*) Notice: Subject to any disclaimer, the term of this patent is extended or adjusted under 35 U.S.C. 154(b) by 0 days.

(21) Appl. No.: 18/832,753

(22) PCT Filed: Jan. 25, 2023

(86) PCT No.: PCT/EP2023/051784
§ 371 (c)(1),
(2) Date: Jul. 24, 2024

(87) PCT Pub. No.: WO2023/144194
PCT Pub. Date: Aug. 3, 2023

(65) Prior Publication Data
US 2024/0420886 A1    Dec. 19, 2024

(30) Foreign Application Priority Data
Jan. 25, 2022  (GB) ..................................... 2200944

(51) Int. Cl.
*H01F 30/04*    (2006.01)
*H01F 3/10*     (2006.01)
(Continued)

(52) U.S. Cl.
CPC ............... *H01F 30/04* (2013.01); *H01F 3/10* (2013.01); *H01F 30/12* (2013.01);
(Continued)

(58) Field of Classification Search
CPC ............ H01F 30/04; H01F 3/10; H01F 30/12; H02M 1/0006; H02M 1/4216; H02M 5/10
See application file for complete search history.

(56) References Cited

U.S. PATENT DOCUMENTS

| | | | | |
|---|---|---|---|---|
| 2015/0263636 A1* | 9/2015 | Bala | ........................ | H01F 27/42 336/170 |
| 2020/0286675 A1* | 9/2020 | Liang | .................. | H01F 27/2804 |

FOREIGN PATENT DOCUMENTS

| | | | | |
|---|---|---|---|---|
| CN | 106411203 A | * | 2/2017 | ............ H01F 27/24 |
| CN | 106411203 | | 3/2019 | |

(Continued)

OTHER PUBLICATIONS

Combined Search & Examination Report issued in GB2200944.3 (Jul. 15, 2022).
(Continued)

*Primary Examiner* — Malcolm Barnes
(74) *Attorney, Agent, or Firm* — Barnes & Thornburg LLP

(57) ABSTRACT

A three phase transformer apparatus for a three phase electrical power transformation system is provided. For each phase of the three phase transformer apparatus the three phase transformer apparatus comprises: an upper core limb having a first end and a second end, a lower core limb having a third end and a fourth end, a first coil assembly comprising a first primary coil and a first secondary coil, and a second coil assembly comprising a second secondary coil and a control coil. The first primary coil and the first secondary coil of each first coil assembly are wound concentrically around the upper core limb or the lower core limb of the respective phase. The second secondary coil and the control coil of each second coil assembly are wound concentrically around the other of the upper core limb and the lower core
(Continued)

limb of the respective phase. The second secondary coil of each second coil assembly is connected in series to the first secondary coil of the first coil assembly of the respective phase. The three phase transformer apparatus further comprises a first yoke portion connected between each of the first ends of the upper core limbs, a second yoke portion connected between each of the fourth ends of the lower core limbs, and at least one transfer yoke portion, configured to allow magnetic flux to flow between the first end of each upper core limb and the second end of the respective upper core limb, and to allow magnetic flux to flow between the third end of each lower core limb and the fourth end of the respective lower core limb. A controller is connected to the control coil of each phase and configured to apply a voltage or current waveform to the control coil in order to influence the transfer of energy between the first primary coils and the first and second secondary coils of the three phase transformer apparatus.

20 Claims, 12 Drawing Sheets

(51) Int. Cl.
    *H01F 30/12*    (2006.01)
    *H02M 1/00*     (2007.01)
    *H02M 1/42*     (2007.01)
    *H02M 5/10*     (2006.01)

(52) U.S. Cl.
    CPC ....... *H02M 1/0006* (2021.05); *H02M 1/4216* (2013.01); *H02M 5/10* (2013.01)

(56) References Cited

FOREIGN PATENT DOCUMENTS

| | | | |
|---|---|---|---|
| DE | 2450467 | 5/1976 | |
| DE | 2450467 A1 * | 5/1976 | ............. H01F 29/14 |
| WO | WO 2014/031959 | 2/2014 | |
| WO | WO 2021/048352 | 3/2021 | |

OTHER PUBLICATIONS

Intention to Grant issued in GB2200944.3 (Jun. 4, 2024).
Notification of Grant issued in GB2200944.3 (Jul. 16, 2024).
Search Report & Written Opinion issued in PCT/EP2023/051784 (Apr. 21, 2023).

\* cited by examiner

ELECTRICAL POWER TRANSFORMER AND ELECTRICAL POWER TRANSFORMATION SYSTEM

CROSS REFERENCE TO RELATED APPLICATIONS

This application is a U.S. nationalization under 35 U.S.C. § 371 of International Application No. PCT/EP2023/051784, filed Jan. 25, 2023, which claims priority to United Kingdom Patent Application No. 2200944.3, filed Jan. 25, 2022. The disclosures set forth in the referenced applications are incorporated herein by reference in their entireties.

TECHNICAL FIELD

The present invention relates to electrical energy supply, and in particular to an electrical power transformation system and process.

BACKGROUND

Electrical energy is delivered from its generation source to the load that consumes it via wires. The electricity is generally transferred at higher voltages than is safe for use as this provides much better efficiency during the transportation. Transformers are used within an electricity system to transform the voltage of electricity via a fixed ratio, either increasing or decreasing the voltage level. Transformers were first invented more than 100 years ago and have not significantly evolved.

As electricity requirements change the existing infrastructure such as transformer are not enough to maintain a reliable energy system. Traditionally the electricity has been generated by a small number of large synchronous generators, providing both the power and stability for the system. The increase of asynchronous variable renewable generation within the electricity system is having adverse effects on its operational stability. The lack of inertia within the system as traditional synchronous fossil fuel generation is lost, coupled with the change from a small number of large generators to large quantities of distributed generators throughout the system has increased the fragility of the network as well as increased energy prices.

Additional equipment must be used within the system to maintain the power quality and reliability of the electricity system. These are primarily additional expensive equipment, with more complexity and a shorter lifespan, leading to a more fragile and costly system.

It would be desirable to have a single device which was able to complete the required voltage transformation, but also provide additional features such as dynamic voltage control, harmonics suppression, and power factor control. Devices exist which provide only part of this functionality, such as described below.

Transformer

As known by those skilled in the art, a transformer is an electromagnetic device that transfers electric energy from one circuit to another circuit via mutual inductance, and is typically made up of a primary winding, a magnetic core and a secondary winding. When an alternating voltage is applied to the primary winding, an alternating current flows through the primary winding. This magnetizing current produces an alternating magnetic flux. The flux is mostly constrained within the magnetic core, and induces voltage in the linked secondary winding, which if connected to an electrical load produces an alternating current. This secondary load current then produces its own alternating magnetic flux which links back with the primary winding.

The secondary voltage is determined by the product of the primary voltage and the ratio of the number of turns in the secondary winding and the number of turns in the primary winding. Transformers are commonly used to convert between high and low voltages, but they are bulky by necessity at distribution frequencies. They offer high efficiency, simplicity of design, and bidirectional power transfer. However, their passive nature affords limited regulation of the power transferred, requiring the introduction of inefficient voltage regulation assets.

Within the electricity grid voltage must be kept within strict tolerances in order for equipment to operate effectively and safely. It would be desirable to have a device which was able to dynamically and precisely control voltage, decoupling the supply and load side voltages, and allowing the correct voltage levels to be maintained.

FACTS Devices

Flexible AC Transmission System (or FACTS) devices have been commercially available for decades. They are a class of hardware devices based entirely on power electronic components. They are designed to be added to an electrical system and inject or absorb power into the system, in a series, shunt, or combined configuration. Such devices are added to the system in addition to the transformer, and due to their extremely high cost have been used very sparingly, and primarily within the transmission system.

Solid State Transformer

A solid state transformer is a replacement for an existing transformer. It consists of a number of component parts connected in series. These parts are a rectifier, an inverter, an electromagnetic core, a rectifier and an inverter. The higher voltage side is connected to the first inverter, which transforms the power from AC (generally 50 Hz or 60 Hz) to DC. The rectifier then transforms the power from DC to a much higher frequency AC waveform. This allows the electromagnetic core of the device to be considerably smaller and cheaper, whilst still providing the voltage transformation. The next rectifier transforms the high frequency AC power to DC, with the final inverter transforming the power back to 50 Hz (or 60 Hz) AC. The control of the power electronics components allows both power factor and additional voltage control to be delivered.

However, these devices are not yet a commercial product and face some challenges before being able to deliver benefits in the real world. These technology challenges include a smaller lifespan and reliability of the power electronics, as well as high costs at power levels the electricity grid operates at.

Exchanger

An Exchanger is a device for the purpose of providing voltage transformation, voltage control, power factor control, and harmonic suppression. It consists of three independent shell type single phase electromagnetic cores. Each single-phase core has a control winding connected to a back to back inverter. The inverters are controlled to provide a current through the control winding that generates an out of phase magnetic field within the electromagnetic core. Each phase of the device is controlled separately and are not connected.

However, these devices are not yet a commercial product and face some challenges before being able to deliver benefits in the real world. These technology challenges include efficiency, weight, and cost.

Hybrid Transformer

WO 2021/048352 discloses a transformer apparatus for an electrical power transformation system. The transfer apparatus comprises three outer transformer limbs arranged in a three-dimensional star or delta arrangement. Such a transformer apparatus provides the voltage change ability of a transformer, whilst simultaneously providing dynamic voltage regulation, harmonic suppression, and power factor correction. Such a transformer apparatus is considered to be a 'hybrid transformer'.

SUMMARY

According to a first aspect of the disclosure, a three phase transformer apparatus for a three phase electrical power transformation system is provided. For each phase of the three phase transformer apparatus the three phase transformer apparatus comprises: an upper core limb having a first end and a second end, a lower core limb having a third end and a fourth end, a first coil assembly, and a second coil assembly. The first coil assembly comprises a first primary coil and a first secondary coil. The first primary coil and the first secondary coil of each first coil assembly are wound concentrically around one of the upper core limb or the lower core limb of the respective phase. The second coil assembly comprises a second secondary coil and a control coil. The second secondary coil and the control coil of each second coil assembly are wound concentrically around the other of the upper core limb and the lower core limb of the respective phase. The second secondary coil of each second coil assembly is connected in series to the first secondary coil of the first coil assembly of the respective phase. The three phase transformer apparatus further comprises: a first yoke portion connected between each of the first ends of the upper core limbs, a second yoke portion connected between each of the fourth ends of the lower core limbs, at least one transfer yoke, configured to allow magnetic flux to flow between the first end of each upper core limb and the second end of the respective upper core limb, and to allow magnetic flux to flow between the third end of each lower core limb and the fourth end of the respective lower core limb, and a controller connected to the control coil of each phase and configured to apply a voltage or current waveform to the control coil in order to influence the transfer of energy between the first primary coils and the first and second secondary coils of the three phase transformer apparatus.

The three phase transformer apparatus according to the first aspect is a hybrid transformer apparatus. As such, the three phase transformer apparatus is able to dynamically and rapidly respond to changes in the input energy received by the system in order to generate corresponding output energy having a target voltage and a target input power factor. In particular, this ability allows the three phase transformer apparatus of the first aspect to match the output energy to the energy demanded by the loads on the system. Moreover, the three phase transformer apparatus can be controlled bi-directionally, meaning that the three phase transformer apparatus can respond when energy is supplied from an energy grid and flowing in one direction, for example, and also for energy supplied from renewable energy sources, which may be flowing through the system in the opposite direction. For example, changes in local energy generation arising from changes in wind and/or changes in available sunlight are able to be mitigated by the system and processed to provide a relatively constant output for a fixed load The three phase transformer apparatus of the first aspect includes first and second coils assemblies for each phase.

The second coil assembly of each phase comprises a control coil wound about a core limb of the transformer (either the upper core limb or the lower core limb for each phase). The control coil is connected to a controller which is configured to apply a voltage or current waveform to the control coil in order to influence the transfer of energy between the first primary coils and the first and second secondary coils of the three phase transformer apparatus. As such, the three phase transformer apparatus is provided with only two coil assemblies for each phase such that the construction of the three phase transformer apparatus is simplified. In particular, the three phase transformer apparatus can be provided with only four coils per phase, with the coils being split between the upper and lower core limbs of each phase.

In some embodiments, the first coil assembly of each phase further comprises an additional control coil, wherein the first primary coil, the first secondary coil and, the additional control coil of each first coil assembly are wound concentrically around the core limb of the respective phase. In some embodiments, the control coil and the additional control coil for each phase are wound in opposite directions about the upper core limb and the lower core limb. As such, one of the control coil and the additional control coil of each phase is wound around the respective core limb in a clockwise manner, while the other control coil of the respective phase is wound around the respective core limb in an anticlockwise direction. By providing control coils of each phase with opposite winding directions, the magnetomotive force can be transferred between the upper and lower core limbs for each phase is an efficient manner. In some embodiments, the control coil and additional control coil of each phase are connected in series.

In some embodiments, the second coil assembly of each phase further comprises a second primary coil, wherein the second primary coil, the second secondary coil, and the control coil of each second coil assembly are wound concentrically around the core limb of the respective phase, wherein the second primary coil of the second coil assembly is connected in series to the first primary coil of the first coil assembly of the respective phase. As such in some embodiments, the second coil assembly for each phase may include up to three coils.

In some embodiments, the controller comprises a voltage control circuit configured to apply a voltage waveform or a current waveform to the control coil of each phase to control a voltage across the first secondary coil and the second secondary coil of each of the phases.

In some embodiments, the controller comprises a power factor control circuit configured to control a power factor of the three phase transformer apparatus. In some embodiments, the power factor control circuit is configured to control the power factor controlled by injecting or absorbing reactive power through the control coil (or control coils) of one or more phases. In addition to this power electronics based control, in some embodiments, additional capacitance or inductance may be introduced into the magnetic circuit through connecting capacitors or inductors to the control coils of each phase.

In some embodiments, the power factor control circuit of the controller comprises a variable reactance for each of the control coils, the power factor control circuit configured to control the reactance connected to each of the control coils in order to control the power factor of the three phase transformer apparatus.

In some embodiments, the controller is configured to draw power from a primary side of the three phase transformer apparatus and is electrically isolated from a secondary side of the three phase transformer apparatus. In some embodiments, the controller is configured to draw power from the secondary side of the three phase transformer apparatus and is electrically isolated from the primary side of the three phase transformer apparatus.

In some embodiments, the controller further comprises an energy storage circuit configured to provide a back-up power source for the controller to apply the voltage or current waveform to the control coil. The energy storage circuit may comprise capacitors, or chemical energy storage (e.g. Lithium-Ion batteries) or any other suitable energy storage element known to the skilled person. In some embodiments, the energy storage circuit is configured to be charged by a power supply for the controller (e.g. the power supplied to the primary coil). This stored energy of the energy storage circuit may be configured to be drawn upon if there is not enough input power from the e.g. the primary coil required in order to meet the target output for the control coil. The level and duration of this capability is directly proportional to the quantity of energy stored by the energy storage circuit. Accordingly, the energy storage circuit may improve the robustness of the three phase transformer to variations in power.

According to this disclosure, it is understood that the upper and lower core limbs for each phase, the first yoke portion, the second yoke portion, and the at least one transfer yoke form an electromagnetic core of the three phase transformer.

In some embodiments, the electromagnetic core of the three phase transformer apparatus has a generally planar design. That is to say, in some embodiments, the upper and lower core limbs for each phase, the first yoke portion, the second yoke portion, and the at least one transfer yoke extend may be arranged in a plane. For example, in some embodiments, the upper and lower core limbs for each phase are arranged in parallel. The first yoke portion, the second yoke portion, and the at least one transfer yoke extend in a direction generally transverse to the upper and lower core limbs. By providing the electromagnetic core having a generally planar design, the three phase transformer may have a simplified construction which is more economic to manufacture.

In some embodiments, the upper core limb of each phase and one of the at least one transfer yoke are arranged in a first plane. In some embodiments, the lower core limb of each phase and one of the at least one transfer yoke are arranged in a second plane. In some embodiments, the first and the second plane may be the same plane.

In some embodiments, the at least one transfer yoke comprises a first transfer yoke connected between the second ends of the upper core limbs and configured to allow magnetic flux to flow between the first end of each upper core limb and the second end of the respective upper core limb flux. In some embodiments, the at least one transfer yoke comprises a second transfer yoke connected between the third ends of the lower core limbs and configured to allow magnetic flux to flow between the third end of each lower core limb and the fourth end of the respective lower core limb. In some embodiments, the upper core limb of each phase and the first transfer yoke are arranged in a first plane. In some embodiments, the lower core limb of each phase and the second transfer yoke are arranged in a second plane. In some embodiments, the first and the second plane may be the same plane.

In some embodiments, the first transfer yoke is spatially separated from the second transfer yoke. By spatially separated, it is understood that the first and second transfer yokes are separated such that the magnetic flux flowing through the first transfer yoke does not flow through the second transfer core yoke. Similarly, the spatial separation result in the upper and lower core limbs being spatially separate. As such, the electromagnetic core of the three phase transformer may be provided in two parts. Such an arrangement may allow for the three phase transformer apparatus to be provided in a more space efficient manner.

In some embodiments, for each phase the second end of each upper core limb is connected to the respective third end of the respective lower core limb. As such, in some embodiments, the electromagnetic core for the three phases may be provided as unitary core comprising both upper and lower core limbs.

In some embodiments, the three phase transformer apparatus further comprises an upper flux return path core connected between a second end of an upper core limb and a first end of the respective upper core limb. In some embodiments, the three phase transformer apparatus further comprises a lower flux return path core connected between a fourth end of a lower core limb and a third end of the respective lower core limb. As such, in some embodiments upper and lower flux return paths may be provided to form a three phase transformer apparatus comprising a shell type electromagnetic core. In some embodiments, where the upper and lower core limbs for each phase are arranged in parallel and the first yoke portion, the second yoke portion, and the at least one transfer yoke extend in a direction generally transverse to the upper and lower core limbs, the upper flux return paths may be provided extending between the first yoke portion and the transfer yoke. In some embodiments, the upper flux return path(s) may be provided in parallel with the upper core limbs. The lower flux return path(s) may be provided extending between the at least one transfer yoke and the second yoke portion in a similar manner. In some embodiments, the one or two upper and one or two lower flux return paths may be provided on opposing sides of the three core limbs. The addition of electromagnetic return pathways at one or more ends of the electromagnetic core allows the zero sequence to flow in an independent return pathway, thereby allowing individual phase power flow control.

In some embodiments, the control coil of each phase is connected in series to the additional control coil of the respective phase. Alternatively, the control coil and the additional control coil of each phase may be independently controlled by the controller.

In some embodiments, the first primary coil and the second primary coil for each phase are connected in series. In some embodiments, the first primary coil and the second primary coil for each phase are wound in the same direction (e.g. both clockwise or both anticlockwise). In some embodiments, the first secondary coil and the second secondary coil for each phase are connected in series. In some embodiments, the first secondary coil and the second secondary coil for each phase are wound in the same direction (e.g. both clockwise or both anticlockwise).

According to a second aspect of the disclosure, a transformer apparatus for an electrical power transformation system is provided. The transformer apparatus comprises:
  an upper core limb having a first end and a second end;
  a lower core limb having a third end and a fourth end;
  a first coil assembly comprising a first primary coil, and
    a first secondary coil, wherein the first primary coil and the first secondary coil are wound concentrically around one of the upper core limb or the lower core limb;

a second coil assembly comprising a second secondary coil and a control coil, wherein the second secondary coil and the control coil are wound concentrically around the other of the upper core limb or the lower core limb, wherein the second secondary coil of the second coil assembly is connected in series to the first secondary coil of the first coil assembly;

at least one transfer yoke portion, configured to allow magnetic flux to flow between the first end of the upper core limb and the second end of the upper core limb, and to allow magnetic flux to flow between the third end of the lower core limb and the fourth end of the lower core limb; and a controller connected to the control coil and configured to apply a voltage or current waveform to the control coil in order to influence the transfer of energy between the first primary coil and the first and second secondary coils of the transformer apparatus.

As such, it will be appreciated that the transformer apparatus of the second aspect is a single phase implementation of the three phase transformer apparatus of the first aspect of the disclosure.

In some embodiments, the first coil assembly further comprises an additional control coil, wherein the first primary coil, the first secondary coil and, the additional control coil of the first coil assembly are wound concentrically around said upper core limb or the lower core limb. The control coil and the additional control coil are wound in opposite directions about the upper core limb and the lower core limb.

In some embodiments, the second coil assembly further comprises a second primary coil, wherein the second primary coil, the second secondary coil, and the control coil of each second coil assembly are wound concentrically around the other of the upper or lower core limb. The second primary coil of the second coil assembly is connected in series to the first primary coil of the first coil assembly.

In some embodiments, the controller further comprises a voltage control circuit configured to apply a voltage waveform or a current waveform to the control coil to control a voltage across the first secondary coil and the second secondary coil.

In some embodiments, the controller comprises a power factor control circuit configured to control a power factor of the transformer apparatus.

In some embodiments, the power factor control circuit of the controller comprises a variable reactance for the control coil (and optionally for the additional control coil), the power factor control circuit configured to control the reactance connected to the second control coil in order to control the power factor of the transformer apparatus.

In some embodiments, the controller is configured to draw power from a primary side of the transformer apparatus and is electrically isolated from a secondary side of the transformer apparatus. In some embodiments, the controller is configured to draw power from the secondary side of the transformer apparatus and is electrically isolated from the primary side of the transformer apparatus.

In some embodiments, the at least one transfer yoke comprises a first transfer yoke connected between the second end of the upper core limb and the first end of the upper core limb, and configured to allow magnetic flux to flow between the first end of the upper core limb and the second end of the upper core limb flux. In some embodiments, the at least one transfer yoke comprises a second transfer yoke is connected between the fourth end of the lower core limb and the third end of the lower core limb, and configured to allow magnetic flux to between the third end of the lower core limb and the fourth end of the lower core limb.

In some embodiments, the first transfer yoke is spatially separated from the second transfer yoke. As such, similar to the first aspect, the electromagnetic core for the transformer apparatus of the second aspect may be provided in two parts.

In some embodiments, the transformer apparatus comprises an upper flux return path core connected between the second end of the upper core limb and the first end of the upper core limb. In some embodiments, the transformer apparatus comprises a lower flux return path core connected between the fourth end of the lower core limb and a third end of the lower core limb.

In some embodiments, the control coil is connected in series to the additional control coil.

BRIEF DESCRIPTION OF THE DRAWINGS

Some embodiments of the present invention will now be described, by way of example only, with reference to the accompanying figures, wherein.

DETAILED DESCRIPTION

Embodiments of the present invention include a transformer apparatus, an electrical power transformation system and process that involve receiving three phases of input electrical energy, each having its own active and reactive power component through its voltage and phase, and converting each of these three inputs simultaneously to a desired or 'target' output voltage and phase and therefore active and reactive power components (i.e. a method of transforming three phase power).

The three inputs will vary over time in both voltage and phase, both absolutely and relative to each other, and thus the system and process operate to dynamically control the transformation of the energy through the apparatus so that the output electrical energy has the desired voltage and phase, which themselves can be varied over time.

Embodiments of the present invention are able to provide RMS voltage conversion while simultaneously providing power factor correction and harmonics suppression, through controlling energy transfer between the three phases in the magnetic domain using additional control windings on the electromagnetic core. This delivers a more efficient and cost-effective solution, as well as electrically isolating the control mechanism input and output of the device.

Although embodiments of the present invention are primarily described herein in the context of power distribution within an electricity grid, it will be apparent to those skilled in the art that other embodiments may be used in any electrical system application that requires control of output voltage and or power factor, such as electrical systems for power generation, commercial and industrial, aviation, rail, marine, energy storage, electric arc furnaces, variable speed drives, electric motors, and other applications, for example. Many other applications of the electrical power supply system and process described herein will be apparent to those skilled in the art in light of this disclosure.

In this specification, unless the context indicates otherwise, the term "signal" is used for convenience of reference, and is to be construed broadly as referring to a form of electrical energy characterised by a voltage and at least one fundamental frequency (which could be zero in the case of a DC voltage), and does not necessarily require that any form of information is represented by or conveyed by the signal.

Overview

Figure 1:
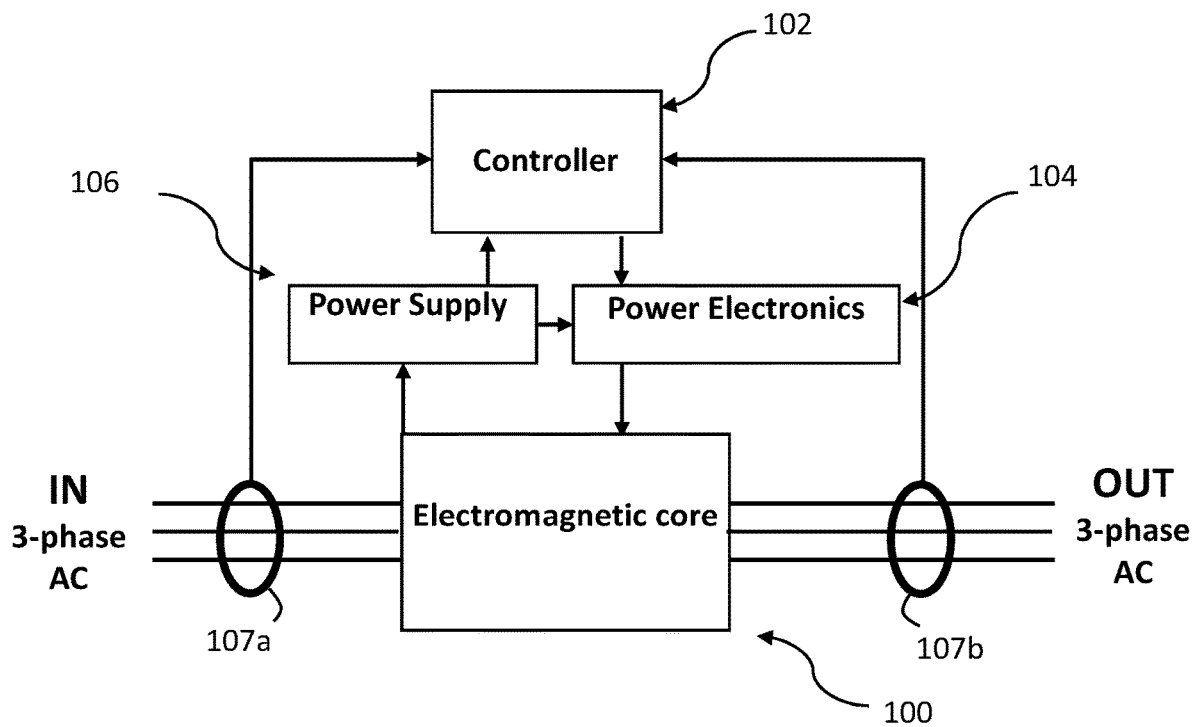
FIG. 1 is a block diagram of the component parts of an electrical energy transformation system in accordance with some embodiments of the present invention.

As shown in FIG. 1, an electrical power transformation system includes an electromagnetic core (e.g. a transformer apparatus) 100, power electronics (e.g. an electronic circuit switching device, such as an inverter) 104, and a controller 102. The controller 102 has input signals from monitoring the three-phase electrical input and three-phase electrical output and uses these to provide a control signal to the power electronics 104. The power electronics 104 (which may be provided as part of controller 102) control the power flowing through control coils on the electromagnetic core 100. The electromagnetic core 100 is also connected to both the three-phase electrical input and three-phase electrical output, providing the voltage transformation, dynamic voltage control, power factor correction, and harmonics suppression. The controller 102 and the power electronics 104 are powered by a power supply 106, which draws power locally from the power flowing through the device. This may be through a winding on the electromagnetic core, or via the input or output power connections, allowing the device to be self-powered as well as conserving energy. Alternatively, the control and power electronics can be powered from an external power source, such as a battery or a mains power connection.

Figure 2:
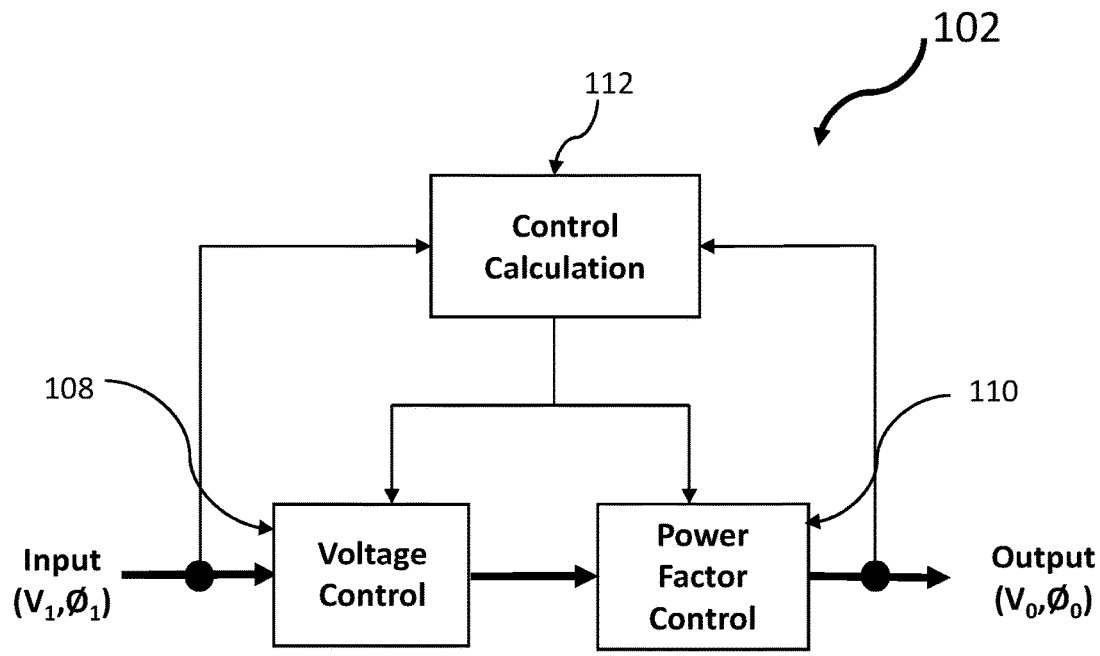
FIG. 2 is a block diagram of a single phase of an electrical energy transformation system process in accordance with some embodiments of the present invention.

The device operates within a three-phase system, with each phase having both a voltage control component 108 and a power factor control component 110. As shown in FIG. 2, each phase input has a voltage and a phase angle, and each output has a voltage and a phase angle. The controller 102 monitors the input and output of each phase simultaneously, and completes a control calculation 112 which provides a control signal to the voltage control component 108 and the power factor control component 110.

Electromagnetic Core

Figure 3:
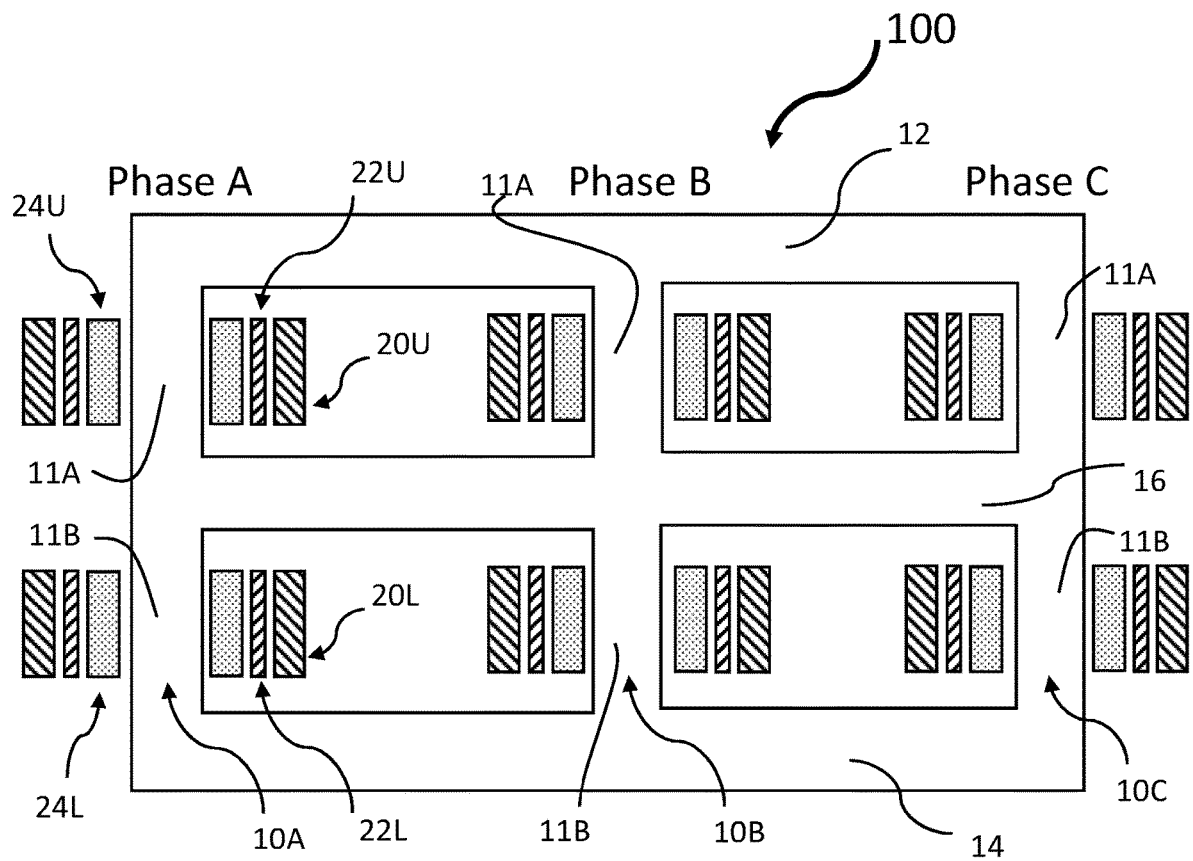
FIG. 3 is a cross sectional diagram of the electromagnetic core and windings in accordance with some embodiments of the present invention.

The electromagnetic core (transformer apparatus) 100 of the device is shown in FIG. 3, shown as a cross-sectional diagram of the device. It comprises three limbs (core limbs) 10A, 10B, 10C, one for each phase of the three-phase power flowing through the device (Phase A, B, and C). Each limb 10A, 10B, 10C comprises an upper core limb 11A and a lower core limb 11B. Each upper core limb 11A comprises a first end and a second end. Each lower core limb comprises a third end and a fourth end.

The core limbs are connected at one end by an upper yoke 12, and at the other end by a lower yoke 14. The first end of each upper core limb is connected to the upper yoke 12. The fourth end of each lower core limb is connected to the lower yoke 14. A middle yoke 16 (i.e. a transfer yoke) is connected to each of the three limbs 10A, 10B, 10C between the upper and lower yokes 12, 14, providing an additional pathway for magnetic flux to flow. As such, the middle yoke 16 may be connected to each core limb between the upper core limb and the lower core limb for each phase. As such, the middle yoke 16 is connected to the second end of each upper core limb 11A and to the third end of each lower core limb 11B. The core 100 may be made of any magnetic material whose including but not limited to ferromagnetic materials. The core itself may be formed as a unitary structure, or may be constructed from multiple component parts, which may be made from the same or different materials for different regions of the magnetic core.

The electromagnetic core 100 may be constructed by stacking laminates of material to form the full cross section of the core. This methodology is particularly applicable for larger transformers as it helps to reduce losses in the core due to eddy currents. The laminates stacked may have different widths for sections, allowing different cross section shapes to be made, such as a circle or rectangle. The core may also be manufactured using a wound core, where a single sheet of material is wound to form the flux pathway. As such, it will be appreciated that the various parts of the electromagnetic core 100 defined in this disclosure (e.g. upper core limbs, lower core limbs, upper and lower yokes 12, 14, middle yoke 16) may refer to respective parts of a stacked laminate core or a wound core, for example. The core may also be manufactured using a combination of both, generally referred to as a unicore construction. For lower power level devices, the core may also be manufactured using a solid cross-section. It will be apparently to those skilled in the art that any existing transformer manufacturing technique or material can be used to build this core without deviating from the scope of the present invention.

Figure 4:
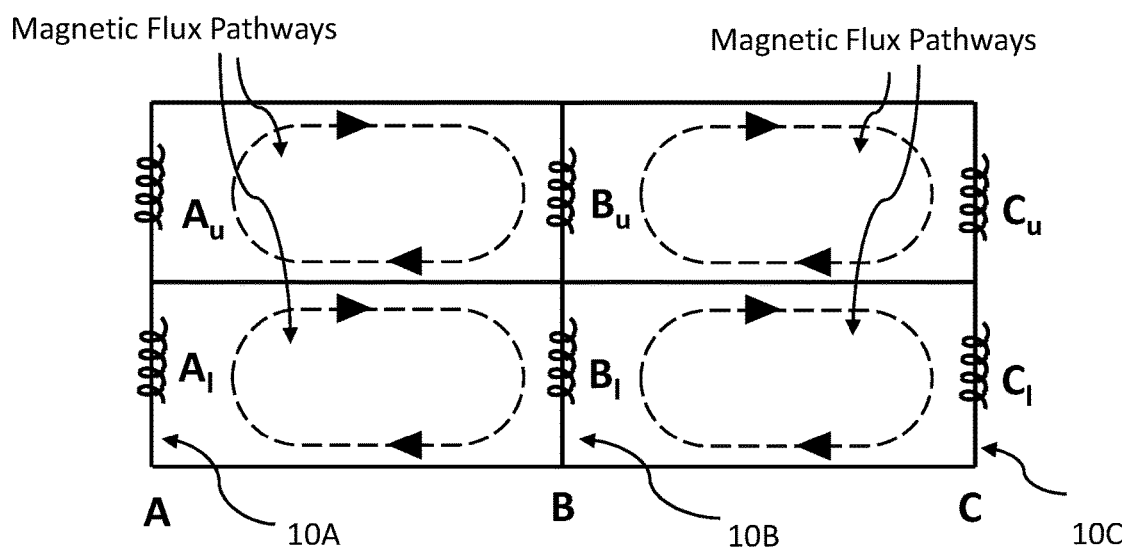
FIG. 4 is a two-dimensional single line representation of the electromagnetic core and windings in accordance with some embodiments of the present invention.

When the single line diagram of FIG. 3 is drawn as a two-dimensional representation it is displayed as shown in FIG. 4. It will be appreciated that the single line diagram of FIG. 3 is a representation of the arrangements of the coils of the device (i.e. a magnetic circuit diagram), and are as such, different to an electronic circuit diagram.

As shown in FIG. 4, each limb 10A, 10B, 10C has two sets of concentrically wound coils, or coil assembly. In FIG. 4 a first coil assembly for each phase is wound around the upper core limb of the respective phase, and a second coil assembly for each phase is wound around the lower core limb of each phase. As such, in FIG. 4 one coil assembly is wound above middle yoke 16 and one below. In other embodiments, the first coil assembly of each phase may be wound around the lower limb of the respective phase and the second coil assembly of the respective phase may be wound around the upper limb of the respective phase. The upper coil on the phase A limb is denoted $A_u$, the lower coil on the phase A limb is denoted $A_l$. Likewise phase B and C coils are denoted $B_u$, $B_l$, $C_u$, and $C_l$.

Each set of concentrically wound coils has three separate coils, primary coils 20U, 20L, secondary coils 22U, 22L, and control coils 24U, 24L. A coil is sometimes referred to as a winding due to the nature of its construction, and for the purpose of this document, the terms coil and winding can be used interchangeable. Each coil in the concentric stack will be separated by a layer of insulation to prevent direct electrical connection.

As shown in FIG. 3, for each coil assembly ($A_u$, $A_l$, $B_u$, $B_l$, $C_u$, and $C_l$) the control coil (24U, 24L) is in the innermost coil, followed by the secondary coil (22U, 22L), with the primary coil (20U, 20L) being the outer most coil. It will be apparently to those skilled in the art that any order of coils wound concentrically can be used without deviating from the scope of the present invention.

In the embodiment of FIG. 3, each pair of primary coils on a limb are connected in series and wound in the same direction. In the embodiment of FIG. 3, each pair of secondary coils on a limb are connected in series and wound in the same direction. In the embodiment of FIG. 3, each pair of control coils may be connected in series, or each control coil may be connected independently, but in both cases are wound in opposing directions.

Figure 20:
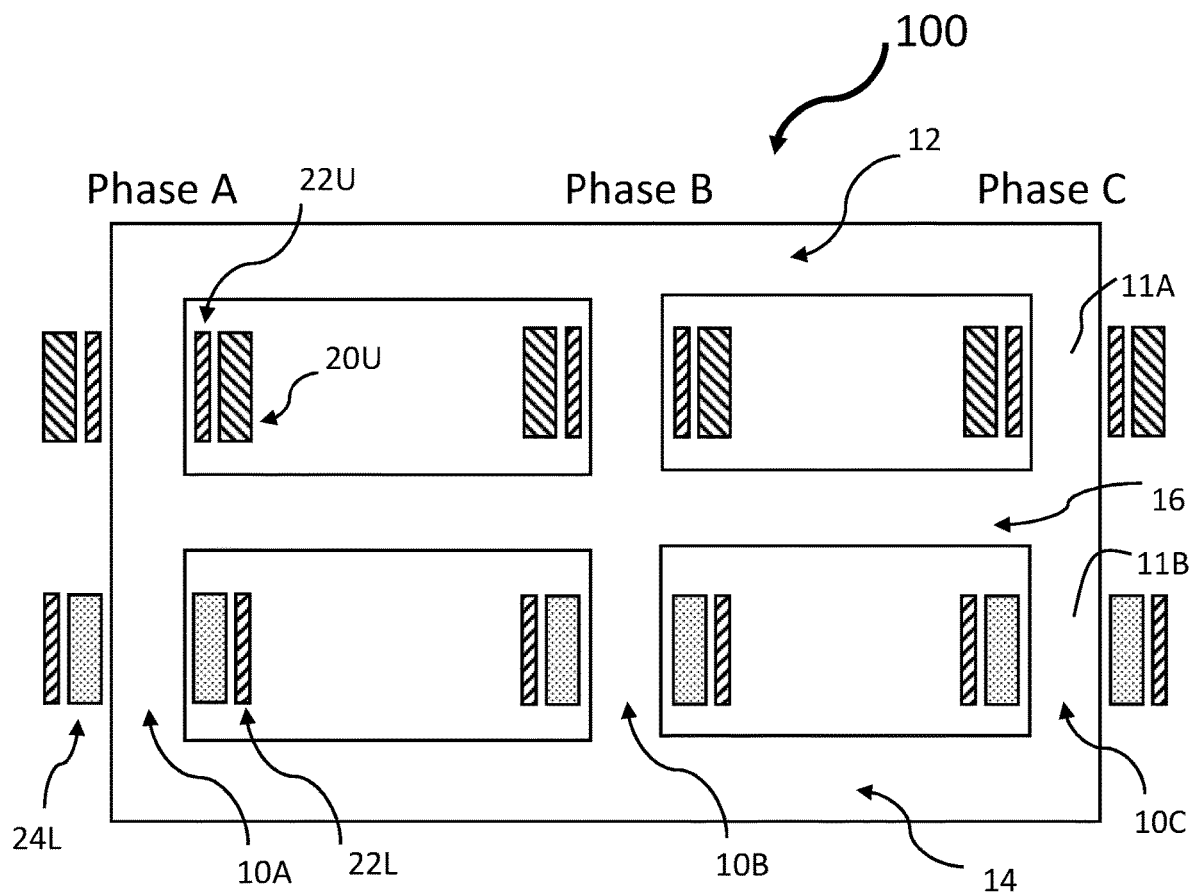
FIG. 20 is a cross sectional diagram of the electromagnetic core and windings in accordance with some embodiments of the present invention.
Figure 21:
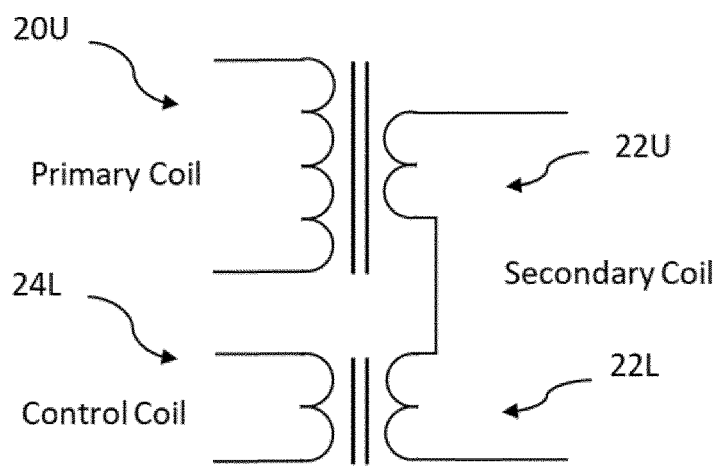
FIG. 21 is a circuit diagram representation of a single phase of some embodiments of the present invention.

While the embodiment of FIG. 3 comprises first and second primary, secondary and control coils, in other embodiments other combinations of first, second, and primary coils may be provided. According to this disclosure, each phase must have a least one coil, and a maximum of two coils, for each of the primary coils, secondary coils, and control coils, making up the combined coil assemblies for that phase (i.e. $C_u$ and $C_l$ for Phase C). At least one of the primary and secondary coils must have two coils connected in series, and there must always be an upper and lower coil assembly separated by the middle yoke. As an example, the electromagnetic core 100 may be constructed as shown in FIG. 20. In this embodiment the upper coil for each phase consists of a primary 20U and secondary coil 22U, and the lower coil consists of a control 24L and secondary coil 22L. The two secondary coils 22U and 22L are connected in series. A circuit diagram representation of a single phase of this embodiment of the electromagnetic core is shown in FIG. 21. Where only one control coil is present the winding may be wound in either direction.

As such, each phase according to this disclosure should be provided with at least 4 coils. In some embodiments, each phase is provided with a first secondary and a second secondary coil, at least one primary coil and at least one control coil. For example, the first coil assembly for each phase may comprise a first primary coil and a first secondary coil. The second coil assembly for each phase may comprise a second secondary coil and a first control coil. As such, the four coils of each phase may be arranged in a 2:2 distribution between the upper and lower core limbs of each phase.

In total there are up to 18 coils on the electromagnetic core 100. These coils can be wound in different manners as would a standard transformer coils be wound. These include helical, disc, cylindrical, and crossover, as described at https://www.elecrical4u.com/trnsformer-winding/ for example. The coil may be wound using a bobbin of any shape. Any material may be used; however, copper wire or copper foil is commonly used. For example, for a 500 kVA distribution transformer, the secondary coil may be constructed of a copper foil, the primary coil constructed of a circular copper wire or disc, and the control winding constructed of a copper foil.

The middle yoke 16 (transfer yoke) in the electromagnetic core 100 shown in FIG. 3 is configured to allow magnetic flux to flow between the first end of each upper core limb 11A and the second end of the respective upper core limb 11A, and to allow magnetic flux to flow between the third end of each lower core limb 11B and the fourth end of the respective lower core limb 11B. As such, the transfer yoke provides the return flux pathway for both the upper and lower coil assemblies. In the embodiment of FIG. 3, the middle yoke 16 connects the mid-point of each core limb together. As the process works with AC power, the flux will flow in alternating directions over time, however the flux will always flow in the same directions through both coil assemblies. When the flux returns through the middle yoke 16 the flux from the upper coil assembly and lower coil assembly will always be in opposing directions, due to the position of the coils, as shown in FIG. 4. As such, these two fluxes will sum to the difference between the two flux magnitudes.

Figure 5:
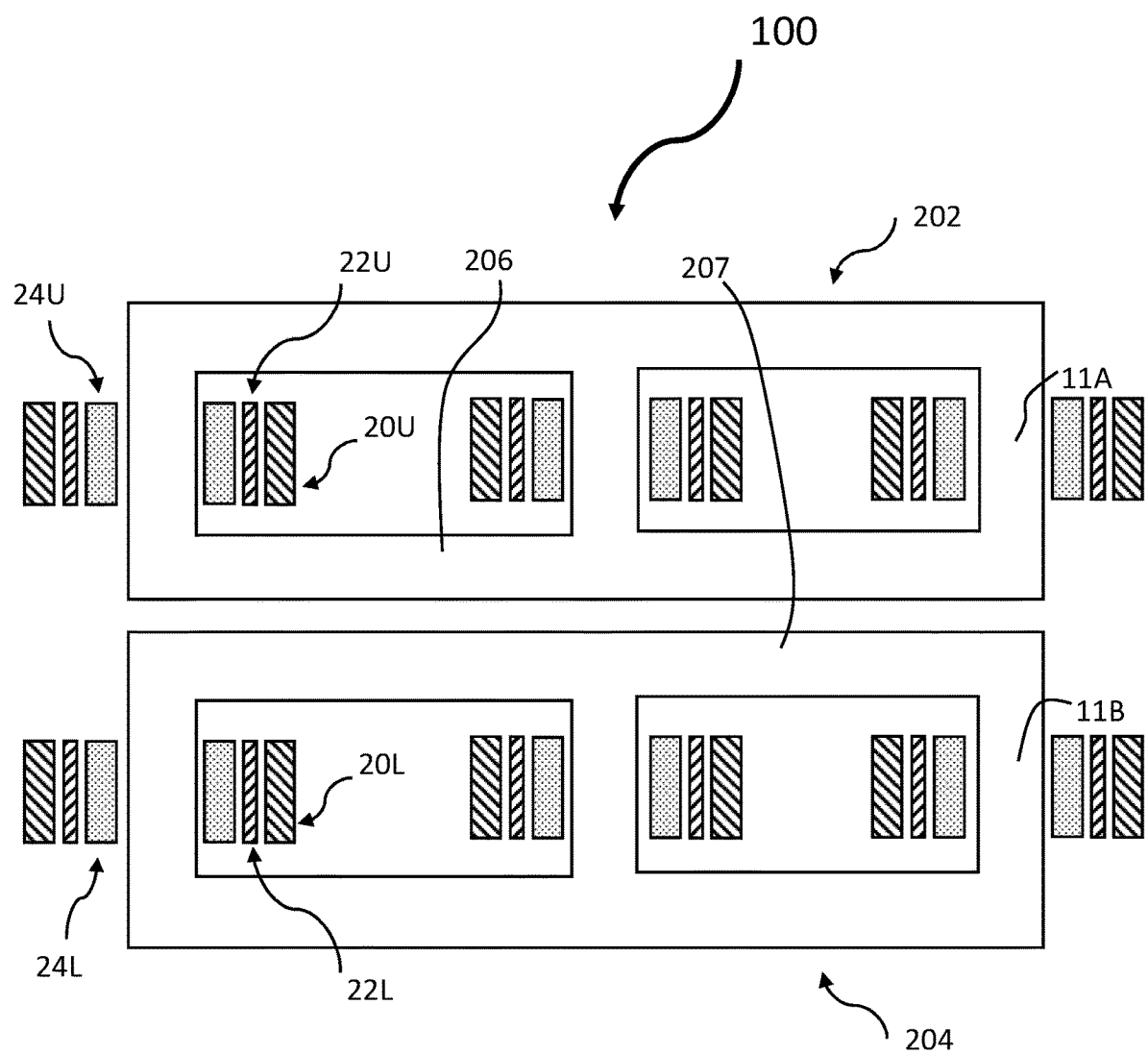
FIG. 5 is a cross sectional diagram of the electromagnetic core and windings in accordance with some embodiments of the present invention.

Rather than a single electromagnetic core, the electromagnetic core 100 may also be separated into two electromagnetic cores, 202 and 204, as shown in FIG. 5. This arrangement is identical from an electromagnetic perspective, however the middle yoke 16 is replaced with two magnetic flux returns paths (first transfer yoke and second transfer yoke). Because of this, electromagnetic core arrangement uses more steel than electromagnetic core arrangement in FIG. 3, but has potential advantages in ease of manufacture and geometric arrangement of the cores 202 and 204 relative to each other. In this electromagnetic core arrangement of FIG. 5, the each set of concentrically wound coils has three separate coils, primary coils 20U, 20L, secondary coils 22U, 22L, and control coils 24U, 24L. Upper coils are wound on electromagnetic core 202 and lower coils on electromagnetic core 204.

Each pair of primary coils on electromagnetic cores 202 and 204 are connected in series and wound in the same direction. Each pair of secondary coils on electromagnetic cores 202 and 204 are connected in series and wound in the same direction. Each pair of control coils on electromagnetic cores 202 and 204 may be connected in series, or each control coil may be connected independently, in both cases are wound in opposing directions.

For clarity, it is not necessary that electromagnetic cores 202 and 204 be physically arranged on top of each other. They may be positioned next to each other in any arrangement providing the coil connections remain the same. As such, it will be appreciated that the terms "upper" and "lower" in respect of the core limbs are used in this disclosure as labels for the core limbs shown in the Figures. That is to say, the terms "upper core limb" and "lower core limb" used in this disclosure, including in the claims could instead be referred to as "first core limb" and "second core limb" for each phase.

Figure 6:
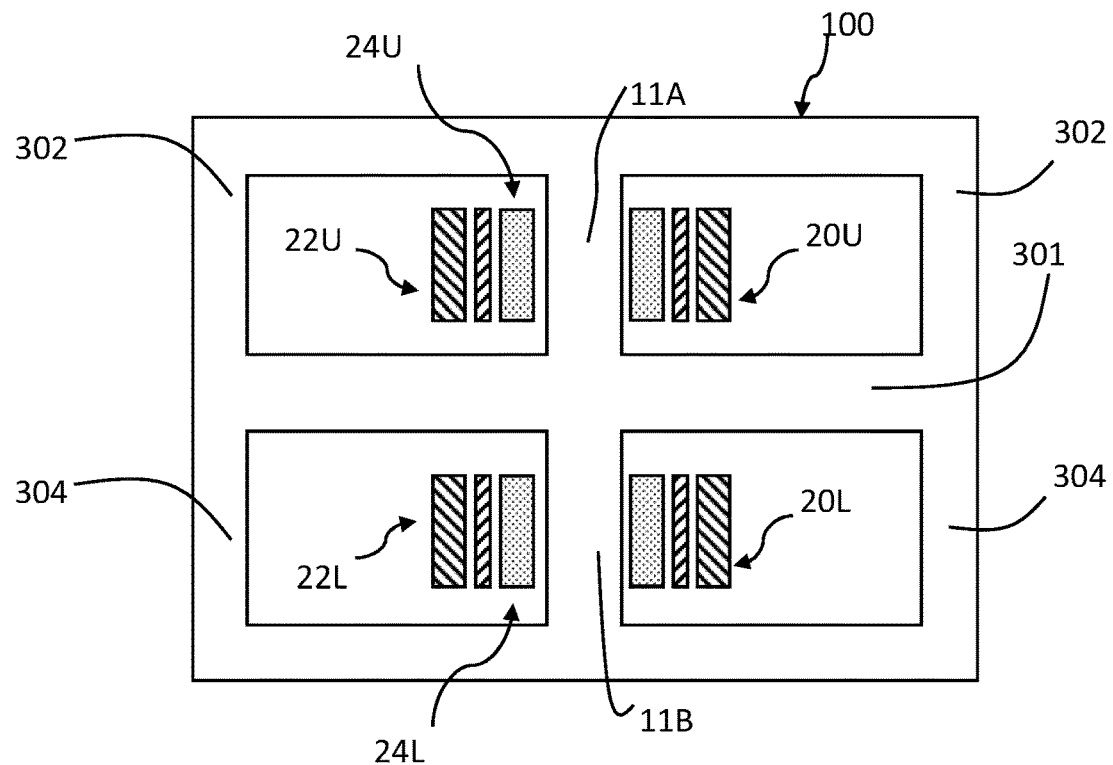
FIG. 6 is a cross sectional diagram of the electromagnetic core and windings in accordance with some embodiments of the present invention.

A single phase implementation of the electromagnetic core 100 is shown in FIG. 6, using a shell type transformer core arrangement. The electromagnetic core 100 comprises an upper core limb 11A and a lower core limb 11B. The upper and lower core limbs 11A and 11B have first and second coil assemblies wound around them in a similar manner to the three phase embodiments discussed above. Similar to the embodiments discussed above, the control coil (and optionally the additional control coil) are provided around the core limbs. The electromagnetic core 100 also comprises a transfer yoke portion 301 which is configured to allow magnetic flux to flow between the first end of the upper core limb and the second end of the upper core limb, and to allow magnetic flux to flow between the third end of the lower core limb and the fourth end of the lower core limb. As such, the transfer yoke portion 301 provides a flux return path for flux flowing through the upper core limb and a flux return path for flux flowing through the lower core limb.

As the electromagnetic core 100 is configured with a shell type core arrangement, the electromagnetic core 100 also comprises two upper flux return path cores 302 connected between a second end of an upper core limb and a first end of the respective upper core limb. The electromagnetic core also comprises two lower flux return paths core 304 connected between a fourth end of an lower core limb and a third end of the respective lower core limb. It will be apparent to those skilled in the art that a core type core arrangement can be used without deviating from the scope of the invention, where only one upper flux return path core and one lower flux return path core is used.

Figure 7:
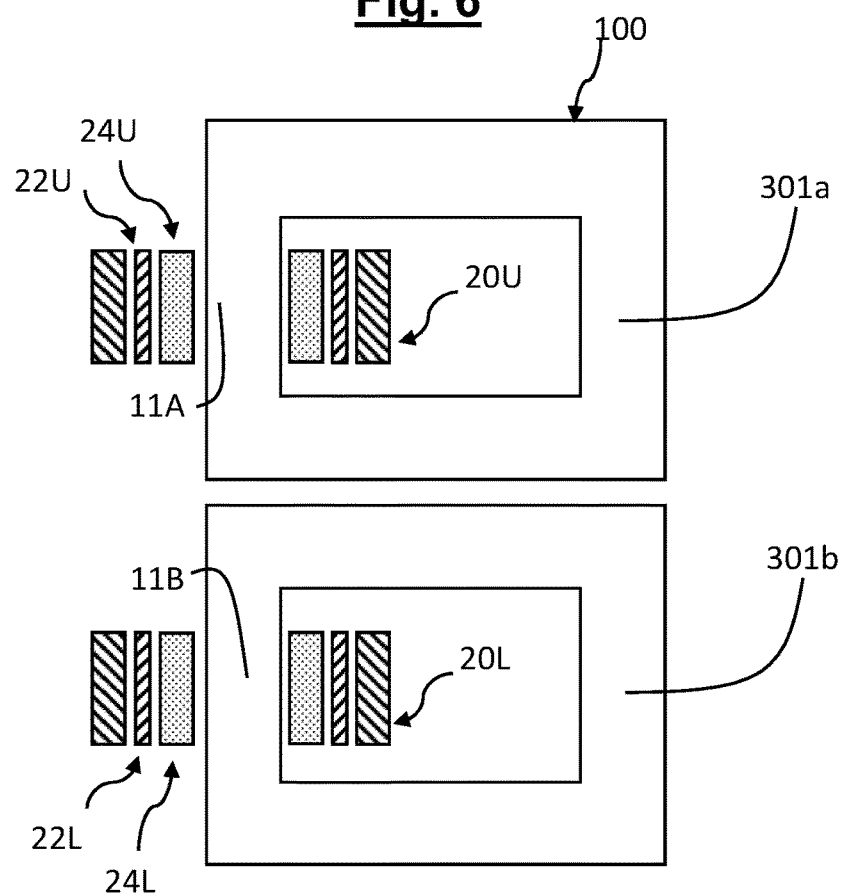
FIG. 7 is a cross sectional diagram of the electromagnetic core and windings in accordance with some embodiments of the present invention.

A single phase implementation of the electromagnetic core 100 in a split configuration is shown in FIG. 7, using a core type transformer core arrangement. As such, in the electromagnetic core 100 of FIG. 7, a first transfer yoke portion 301a is provided connected between the second end of the upper core limb 11A and the first end of the upper core limb 11A. A second transfer yoke portion 301b is provided connected between the fourth end of the lower core limb 11B and the third end of the lower core limb 11B. As shown in FIG. 7, the first transfer yoke portion 301a is spatially separated from the second transfer yoke portion 301b such that the magnetic flux flowing through the first transfer yoke portion 301a does not flow through the second transfer yoke portion 301b. It will be apparent to those skilled in the art that a shell type core arrangement can also be provided in a split configuration comprising first and second transfer yoke portions 301a, 301b.

Figure 8:
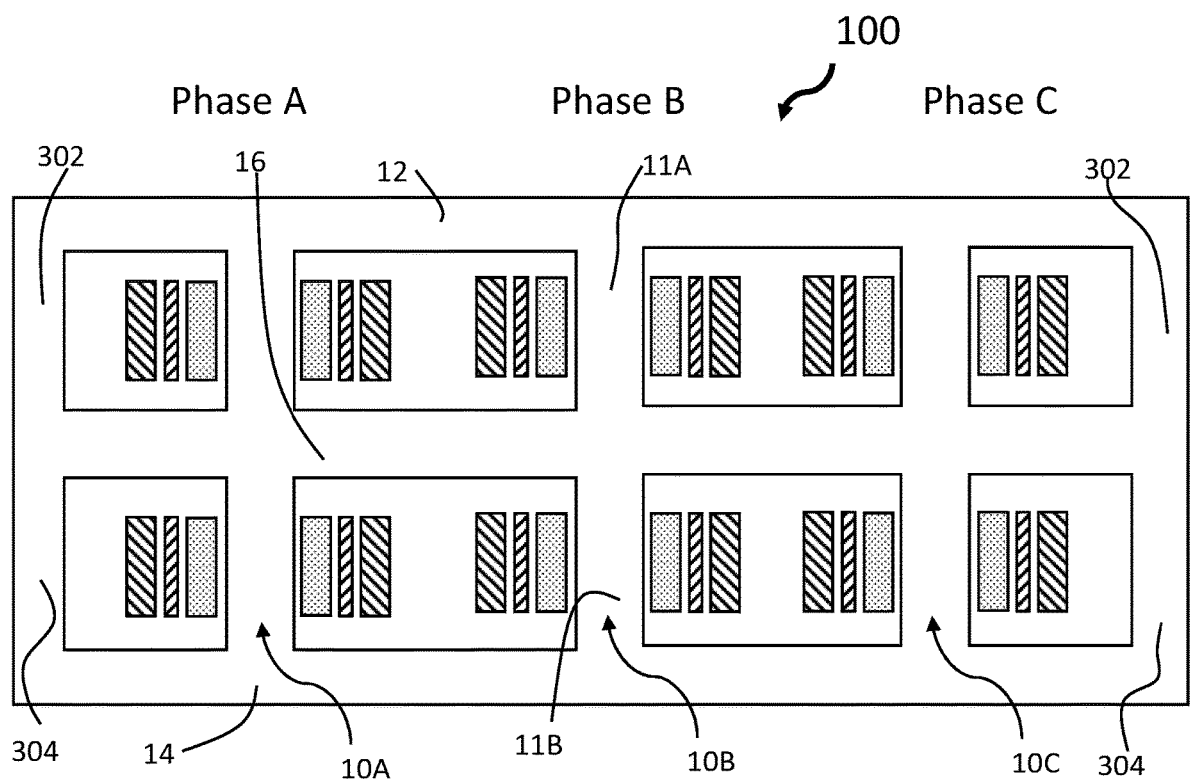
FIG. 8 is a cross sectional diagram of the electromagnetic core and windings in accordance with some embodiments of the present invention.

FIG. 3 and FIG. 5 show the three phase implementations of electromagnetic core 100 in a core type arrangement. These two electromagnetic cores can be implemented as shell type cores by adding a return flux path at one end, or both ends of the core. As an example, FIG. 8 shows electromagnetic core 100 in a shell type configuration with return paths added at both ends. The addition of electromagnetic return pathways at one of either end of the electromagnetic core 100 allows the zero sequence to flow in an independent return pathway, thereby allowing individual phase power flow control.

It will be appreciated that the electromagnetic cores shown in the embodiments of this disclosure are of a generally planar design. That is to say, in some embodiments, the core limbs of each phase and the yokes they are connected to extend in a plane. For example, in the embodiment of FIG. 3, the upper core limb 11A of each phase, the lower core limb 11B of each phase, the upper yoke 12, the lower yoke 14, and the middle yoke 16, which are all interconnected, all extend in the same plane. In the embodiment of FIG. 5, the upper core limbs 11A of each phase are connected to the upper yoke 12 and the first transfer yoke 206, and all extend in the same plane. In the embodiment of FIG. 5, the lower core limbs 11B of each phase are connected to the lower yoke 14 and the second transfer yoke 207 and all extend in the same plane.

Power Electronics

Power electronics 104 are used to provide the power flowing through the control coils 24U and 24L of electromagnetic core 100, where energising the control coils with the appropriate timing will allow energy to be injected or extracted from each phase. Depending on the timing of this energisation relative to the AC power flowing from the primary coils 20U and 20L, to the secondary coils 22U and 22L, the energy will either be in the form of reactive or active power.

When the control coils 24U and 24L are short circuited, no energy will flow through them and the energy flowing from the primary coils 20U and 20L, to the secondary coils 22U and 22L will not be influenced, thereby making the electromagnetic core act as a standard fixed ratio transformer. This provides a failsafe mode for the device, should the power electronics 104 have a fault the control coils 24U and 24L are short-circuited and the device operates as a standard transformer.

The power electronics 104 use the switching of electronic transistors to modulate the power flow output. These gates can be different types depending on the power rating and switching speed required for a particular size and performance of the power flow transformation device. It will be apparent to those skilled in the art that transistors such as IGBT (insulated-gate bipolar transistor) or mosfet (metal-oxide-semiconductor field-effect transistor) can be used for this application. Other technologies such as Silicon Carbide and Gallium Nitride are also in development in the field and can be used.

Figure 9:
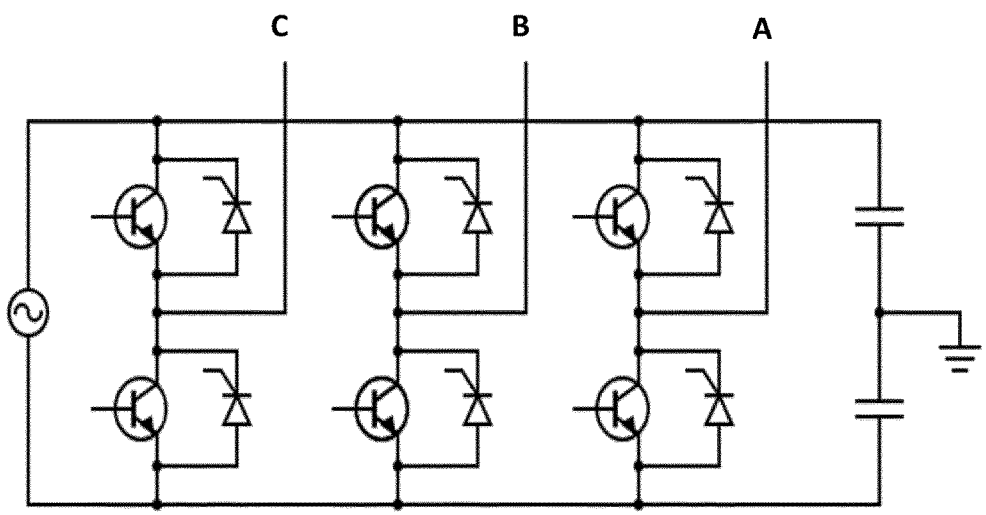
FIG. 9 is a circuit diagram of the power electronics approach to provide the pulse width modulation of the control coils.

For electromagnetic core 100, the transistors for the power electronics 104 are arranged as shown in FIG. 9 and switched on and off by the controller 102 in order to provide the desired power level in the control coil. If there are two control coils per phase connected in series the outputs in FIG. 9 are connected to the control windings 24U and 24L, where output A is connected to the control coils in $A_u$ and $A_l$, output B is connected to the control coils in $B_u$ and $B_l$, and output C is connected to the control coils in $C_u$ and $C_l$. If control coils 24U and 24L are wound independently, an additional 3 outputs are required from the power electronics. This can be achieved by increasing the number of bridges in the power electronics circuit to 6. If there is only one control coil per phase, the power electronics as shown in FIG. 9 can be used, with each of the 3 outputs connected to the corresponding phase control coil.

The power electronics 104 include two bridges for each phase, or in the case of independently wound control coils, two bridges for each control coil. In addition to bridges, capacitors, and a common neutral are used for all phases. In some embodiments, the power electronics 104 may include two half bridges for each phase or control coil, capacitors and a common neutral. It will be obvious to those skilled in the art that many different transistor arrangements can be used, such as full bridges, to achieve the same effect and desired functionality for the device without deviating from the scope of this invention.

Figure 18:
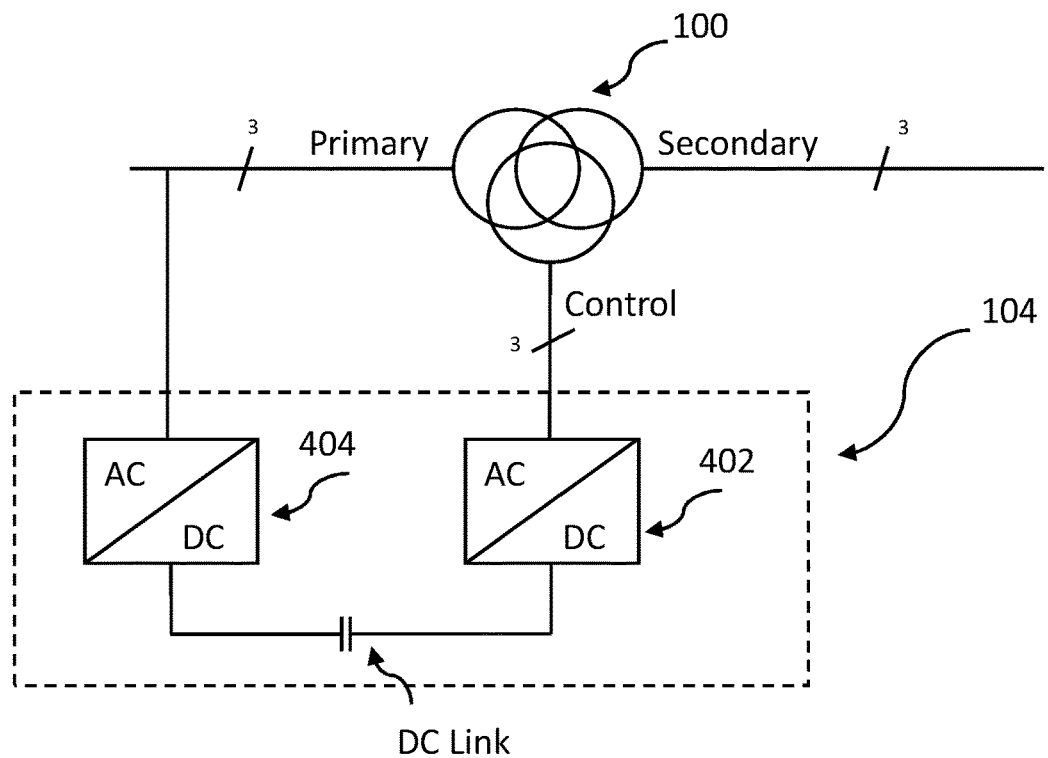
FIG. 18 is a representation of the electromagnetic core winding connections to the power electronics in accordance with some embodiments of the present invention.

For voltage and harmonic control functions, the power electronics 104 can achieve the desired outcome using zero active power. This means only a single module as shown in FIG. 9 is required. For voltage, harmonics, and power factor correction functions, two power electronics modules may be used. These can be connected in various topologies, such as back-to-back modules as shown in FIG. 18. These modules can either be connected from the control coils to the primary side of the device, as shown in FIG. 18, or equally they can be connected from the control coils to the secondary side of the device. The side of connection will change the voltage and current level requirements of the power electronics module as the voltage of the primary and secondary are different, however the overall power level will remain the same.

In the arrangement shown in FIG. 18, a DC link is used to connect the two modules 402 and 404. When connected in this arrangement the modules are able to provide both active and reactive power control, allowing voltage, harmonics, and power factor control simultaneously.

It is also possible to remove the DC link between 402 and 404. If this link is removed and each module operates independently, 402 will provide the voltage and harmonics control, and 404 will provide power factor control. In this arrangement 404 acts similar to a small STATCOM connected to the power system within the device.

Figure 19:
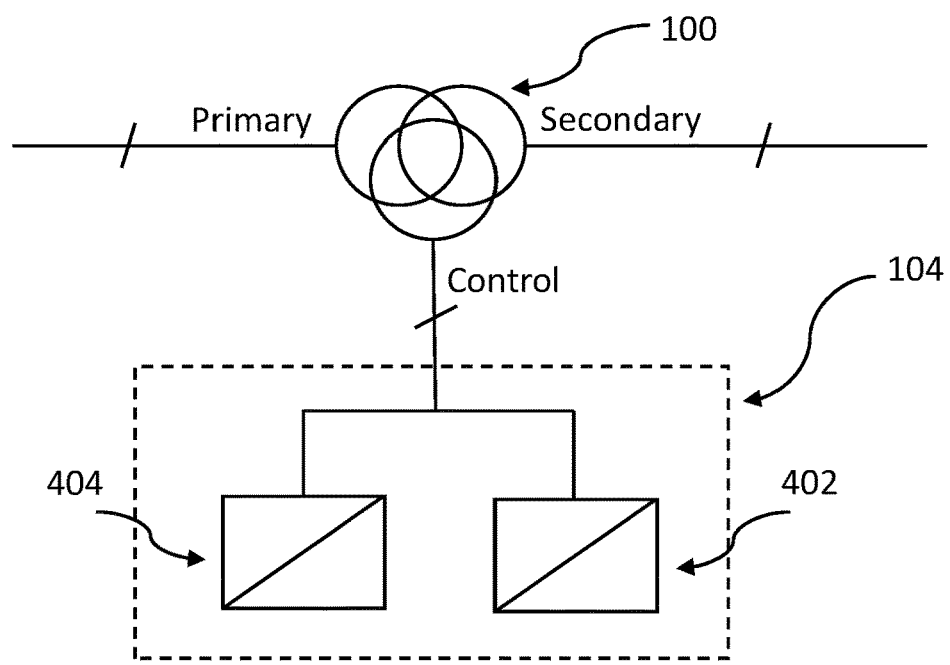
FIG. 19 is a representation of the electromagnetic core winding connections to the power electronics in accordance with some embodiments of the present invention.

Another arrangement of the power electronics 104 is shown in FIG. 19. In this arrangement two modules 402 and 404 are connected separately to the control coils. This allows the full range of voltage, harmonics, and power factor control (through active and reactive power) whilst maintaining galvanic isolation between the power electronics 104 and the power system, as the power electronics 104 are only connected to the electromagnetic core 100 through coils.

It is also possible to add energy storage into the power electronics circuit. This can be in the form of capacitors, or chemical energy storage such as Lithium-Ion batteries. The energy storage device would be able to be charged by the power electronics using power flowing through the device and create an energy reserve. This reserve could be drawn upon if required in order to meet the target output when there is not enough input power from the primary coil. The level and duration of this capability is directly proportional to the quantity of energy stored.

As an example, the energy storage could be trickle charged on device power up. If the output power is higher than the input power received, additional energy can be injected into the device by the controller using the energy storage. This allows the output of the device to maintain the desired level without impacting the upstream energy system. This could occur whilst there is stored energy remaining in the device. If there is no energy in the storage, the device will operate as it would without energy storage. When there is excess available power on the input, the controller will charge the energy storage for later use.

The energy storage will be charged by the power electronics circuit, and injected into the device when needed through the control coils.

The transistors are controlled using a high speed microprocessor (the controller 102) such as the 100 MHz Texas Instruments device described at http://www.ti.com/product/TMS320F2808, powered from the power flow through the device, and the electrical power supply processes 112 (as shown in FIG. 2) are implemented as configuration data stored in non-volatile memory. The microprocessor executes a control process to PWM the transistors in the bridge circuits shown in FIG. 9. The control algorithm operates at a speed of 50 kHz, or three orders of magnitude higher than the fundamental frequency of the power waveform it is controlling (50 Hz). The control algorithm 112 can operate at a higher or lower frequency without deviating from the scope of the invention. A lower frequency can be used depending on the resolution and accuracy of the control required. A higher frequency can be used and will be limited by the capabilities of the control hardware utilised. A faster control algorithm will result in more immediate and accurate control. It will be obvious to those skilled in the art that other technologies can be used in place of a microprocessor, such as a field programmable gate array (or FPGA) without deviating from the scope of the invention. It will also be apparent to those skilled in the art that in other embodiments the controller may be powered by a separate local power supply where available, such as local control power from a distribution board.

Voltage Control

Figure 10:
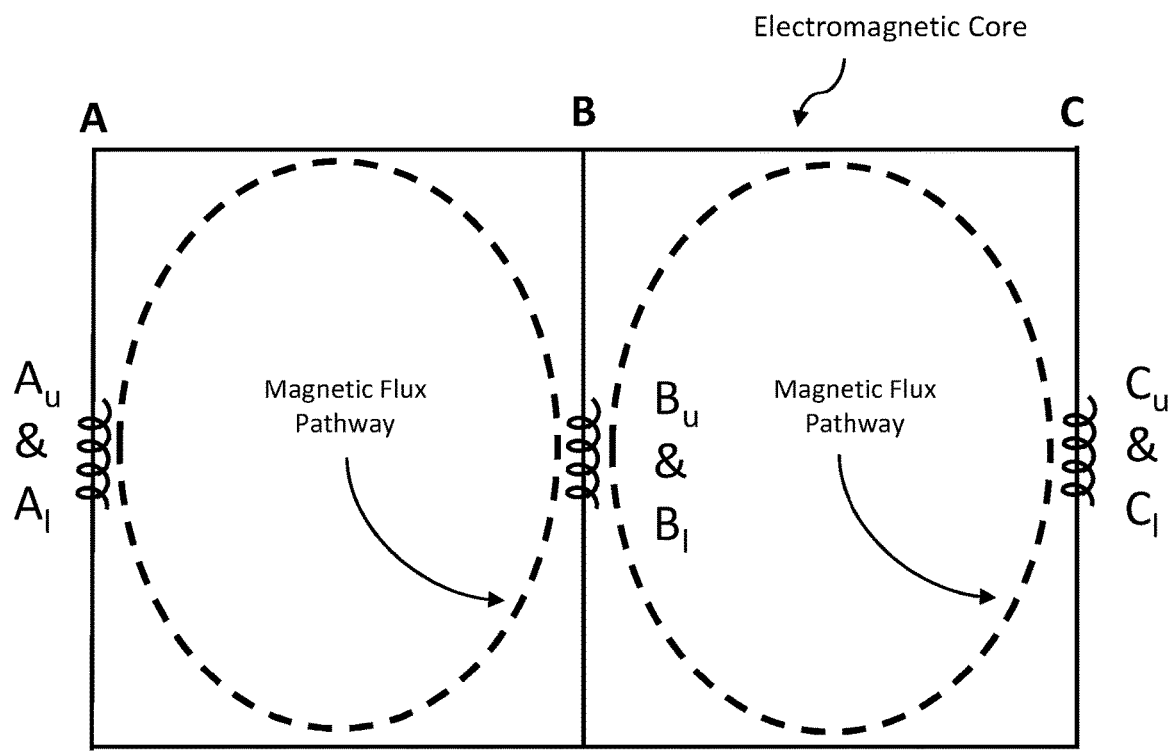
FIG. 10 is a two-dimensional single line representation of a standard three phase transformer with concentric primary and secondary windings.

Electric power flows through the primary coils (20U, 20L) which generates a magnetic flux that flows through the magnetic core and generates an electric current in the secondary coils (22U, 22L). For a standard three-phase transformer with concentric primary and secondary coils on each phase, the flux flows through the pathways shown in FIG. 10. It can be seen that there are only 2 flux pathways available for the three phases of energy in a normal arrangement. As can be seen in FIG. 4, this invention provides 4 flux pathways for the three phases (and more than 4 in some embodiments).

Figure 11:
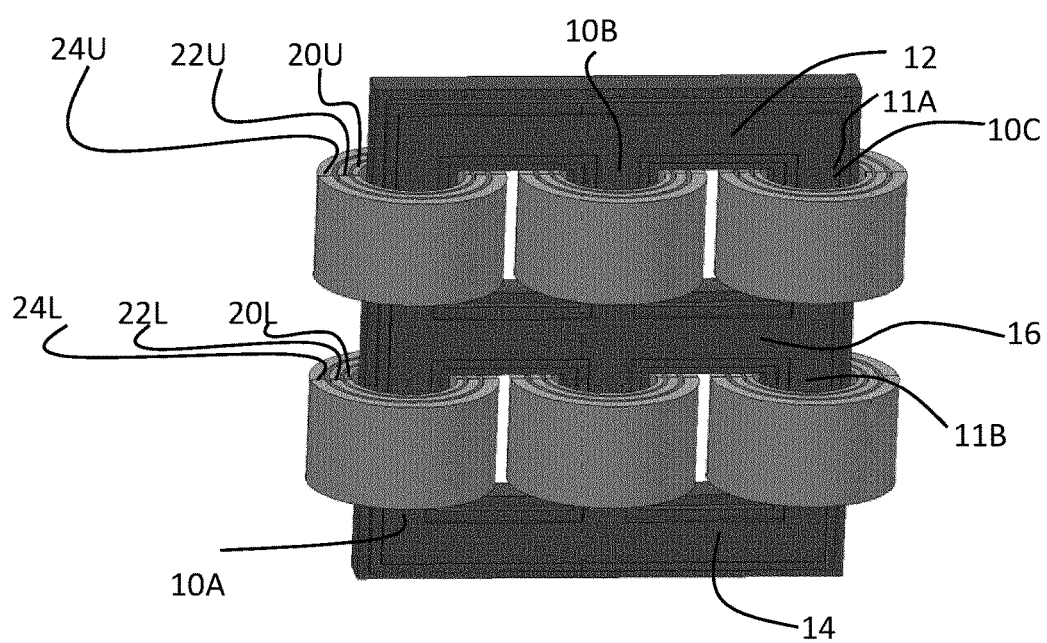
FIG. 11 is a three-dimensional diagram of the electromagnetic core and windings in accordance with some embodiments of the present invention.

For each phase of the device, at least one of the primary and secondary coils for the power flow transformation device are split, one coil above the middle yoke (the upper coil $A_u$, $B_u$, and $C_u$) and one coil below the middle yoke (the lower coil $A_l$, $B_l$, and $C_l$). For example, FIG. 11 shows a three-dimensional representation of one such arrangement, using the electromagnetic core arrangement shown in FIG. 3. The number of turns in the upper and lower coil for the primary and secondary are different:

Primary upper coil 20U turns: $P_u = N_1 \cdot n$
Secondary upper coil 22U turns: $S_u = N_2 \cdot (1-n)$
Primary lower coil 20L turns: $P_l = N_1 \cdot (1-n)$
Secondary lower coil 22L turns: $S_l = N_2 \cdot n$
Where $0 < n < 1$ N1 is the total number of turns the primary coil has for that phase (20U+20L), and N2 is the total number of turns the secondary coil has for that phase (22U+22L).

When the power electronics 104 controls the power (either voltage or current) in the control coils 24U and 24L, magnetomotive force (mmf) is injected or absorbed from the flux path, where mmf=NI ampere-turns (At), N=number of conductors (or turns) and I=current.

As control coils 24U and 24L are wound in opposing directions, the mmf applied to the upper coil assemblies ($A_u$, $B_u$, and $C_u$) and lower coil assemblies ($A_l$, $B_l$, and $C_l$) will be opposite.

As an example, the power flow transformation device can have a value of n=2/3, $N_1$=60, N2=30. Then:

$P_u = N_1 \cdot n = 60.2/3 = 40$ turns
$S_u = N_2 \cdot (1-n) = 30.(1-2/3) = 10$ turns
$P_l = N_1 \cdot (1-n) = 60.(1-2/3) = 20$ turns
$S_l = N2 \cdot n = 30.2/3 = 20$ turns When the control coils are short-circuited the voltage transformation will be $N_1$:N2, or 60:30=2:1 (i.e. 200V on primary will produce 100V on the secondary).

When additional mmf is provided to the magnetic circuit through the control coils it will impact the flux flowing through the upper and lower coils. If this mmf produces the equivalent of a 10% change in each, then:

$P_u = N_1 \cdot n = 60.2/3 - 10\% = 36$ turns
$S_u = N_2 \cdot (1-n) = 30.(1-2/3) - 10\% = 9$ turns
$P_l = N_1 \cdot (1-n) = 60.(1-2/3) + 10\% = 22$ turns
$S_l = N_2 \cdot n = 30.2/3 + 10\% = 22$ turns Therefore the voltage transformation will be $N_1$:$N_2$, or 36+22:9+22=58:31 (i.e. 200V on primary will produce 106.9V on the secondary).

If n=0.5 then both the upper and lower coils have the same number of turns, and the voltage control methodology will not work.

Harmonics Control

Harmonics are distortion within the sinewave of AC power, i.e. deviations from the instantaneous voltage magnitude for that point in the cycle. Harmonics can therefore be controlled through the same mechanism of voltage control described above.

Power Factor Control

Power factor can be controlled by injecting or absorbing reactive power through the control coils 24U and 24L using power electronics 104. In addition to this power electronics based control, additional capacitance or inductance may be introduced into the magnetic circuit through connecting capacitors or inductors to the circuit through the control coils, which may be switched in or out of the circuit using thyristors (or any similar switching technology). Additionally, this additional capacitance and, or, inductance can be connected to the device using additional coils that may be wound concentrically as part of coil assemblies ($A_u$, $B_u$, $C_u$, $A_l$, $B_l$, and $C_l$), or be located at any point on the electromagnetic core 100.

Control Methodology

The controller 102 receives information from sensors, for example line voltage sensors 107a, 107b on the electrical input and output power of the device, which can be located on the primary and secondary coils. This information allows the controller to know the voltage and phase angle (which is the angle between the voltage and current waveforms) on the input and output. The controller 102 then compares the output waveform to the target or "desired" output waveform using the control calculation 112. Any difference between the actual and target outputs creates a delta signal which is provided to voltage control circuit 108 and Power factor control circuit 112 which generate a corresponding control signal. The target waveform is stored within the controller memory but may be altered over time.

The controller 102 provides instructions to the power electronics 104 in the form of control signals. The power electronics 104 are then operated by switching the gates in FIG. 9 using a pulse width modulation (PWM) scheme. This provides the electrical input for the control coils 24U and 24L, where a waveform is approximately by opening and closing the gates with varying durations. PWM control methods can include simple boost, maximum boost, constant boost, direct torque, and modified space vector. In addition to using PWM, other control methodologies may be used to achieve the result of power flow control through the transfer coils without changing the scope of this invention. These control methodologies include but are not limited to open loop, closed loop, fuzzy control, sliding mode control, model predictive control, field-oriented control (also known as vector control).

Figure 12:
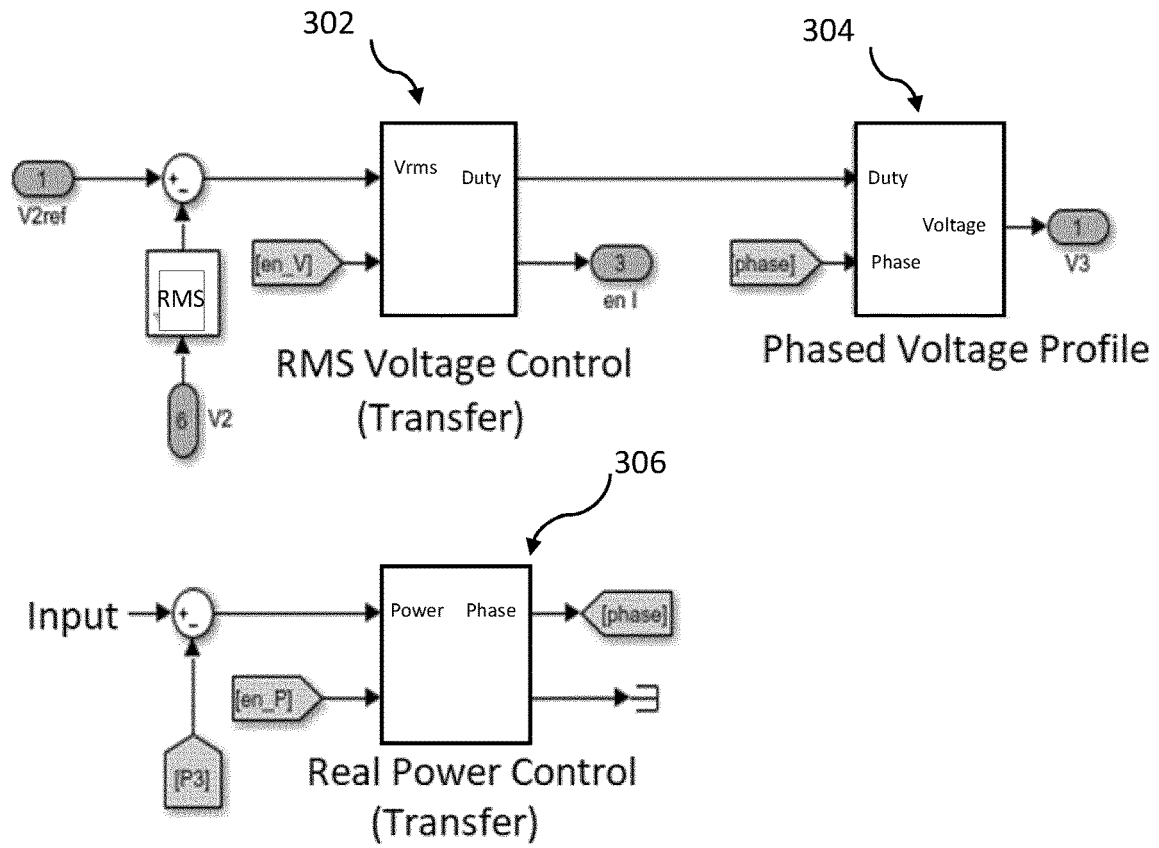
FIG. 12 is a software function block diagram showing component parts of the device control algorithms for voltage control.

One such implementation is shown in FIG. 12, as a high level function block control diagram for the voltage control 108. A reference RMS voltage is compared with the actual measured voltage. When voltage control is enabled, Vrms Control 302 generates a duty cycle and the real power control 306 generates a phase reference. These two parameters are then provided to the phased voltage profile generator 304, which provides the power electronics with the signals required to activate the transistor gates.

Figure 13:
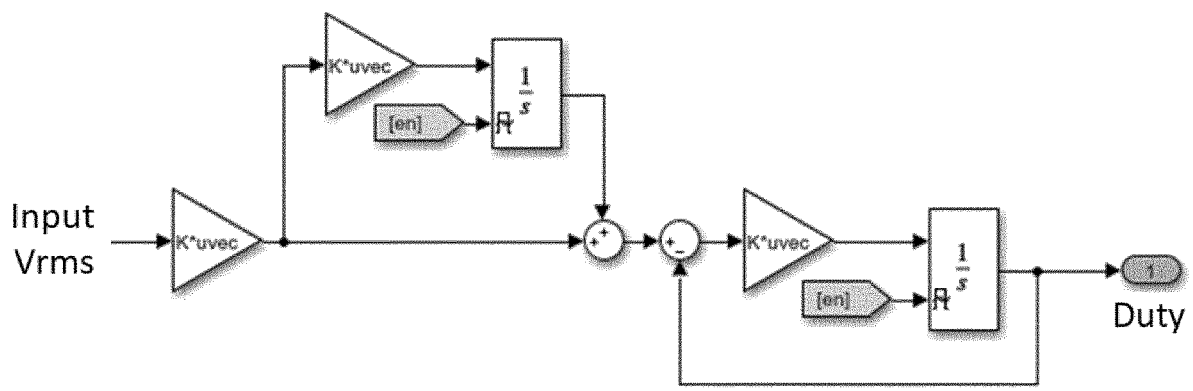
FIG. 13 is a software function block diagram showing a control strategy for voltage control in accordance with some embodiments of the present invention.

There are a number of ways Vrms Control 302 can be achieved, with one such implementation shown in FIG. 13. In this instance a PI (proportional-integral) control strategy is being used with a feedback loop to generate the duty cycle for a phase.

Figure 14:
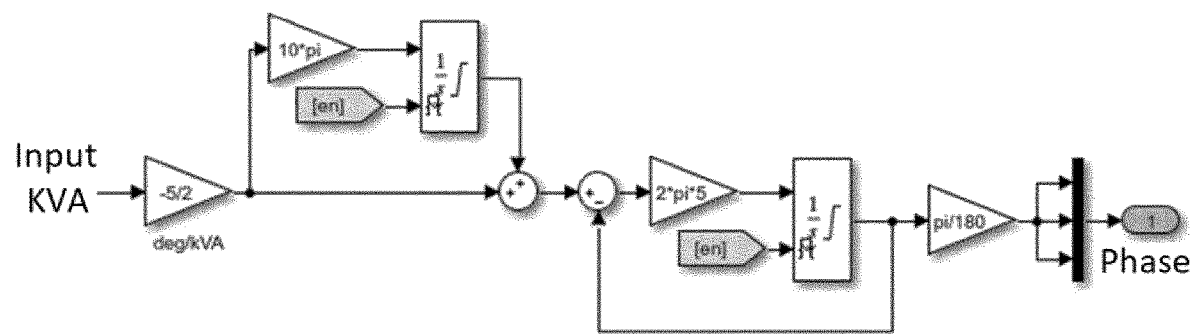
FIG. 14 is a software function block diagram showing a control strategy for real power control in accordance with some embodiments of the present invention.

There are a number of ways real power control 306 can be achieved, with one such implementation shown in FIG. 14. In this instance a PI control strategy is being used with a feedback loop to generate the phase reference for each phase.

Figure 15:
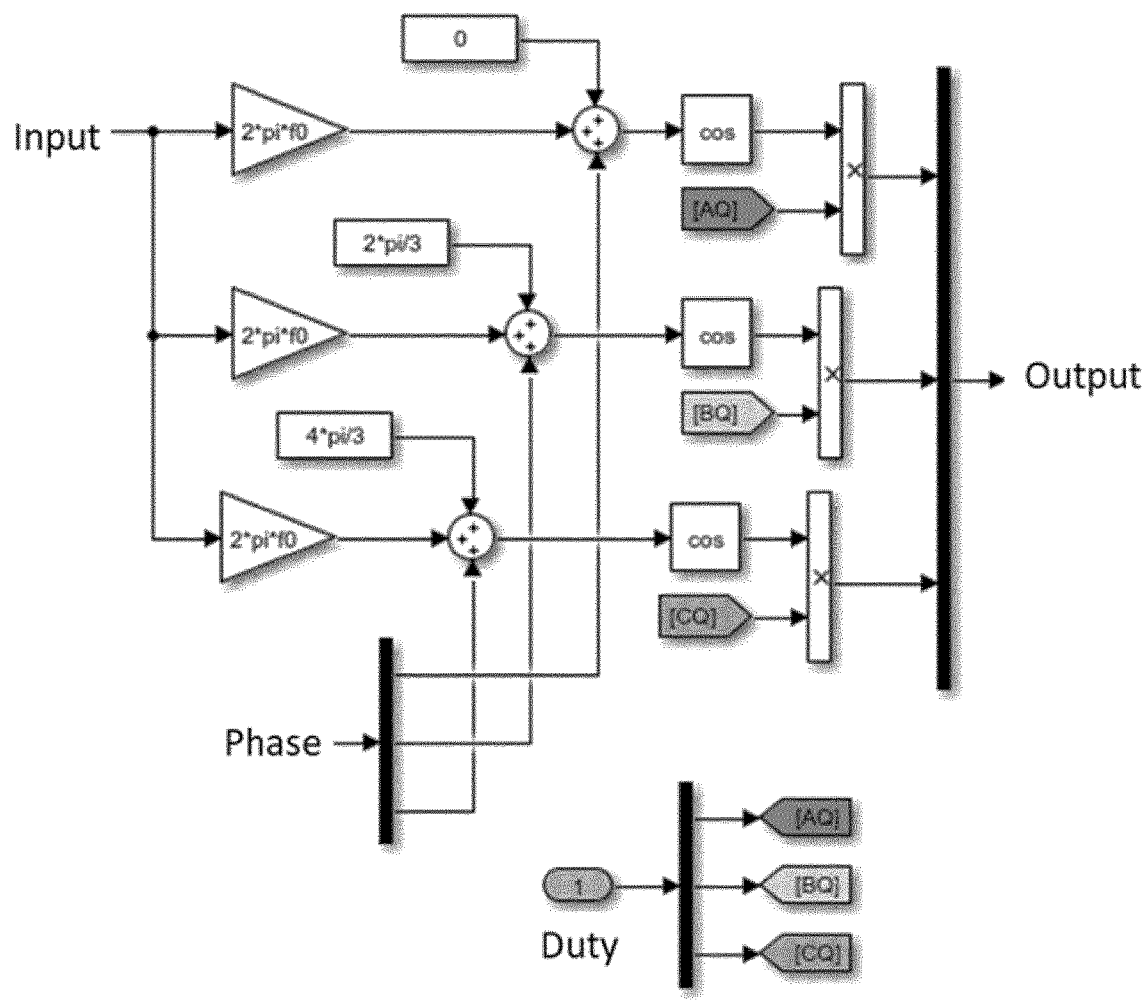
FIG. 15 is a software function block diagram showing a control strategy for generating a phase voltage profile in accordance with some embodiments of the present invention.

There are a number of ways phased voltage profile generator 304 can be achieved, with one such implementation shown in FIG. 15. The phase from the real power control 306 is the summed with the optimal phase angle separation of 120 degrees, and the measured phase angle. The cosine of each of these is combined with the duty component for each phase from the Vrms control 302. The output of this phased voltage profile generator 304 is the reference signal that controls the power electronic gates in FIG. 9.

Power factor control is possible by using the control coils to inject or extract reactive power. This is done by controlling the PWM of the control coils to phase shift the waveform relative to the waveform of the power flowing through the primary and secondary coils. Having the control waveform out of phase with the flux in the core will result in the addition or subtraction of a reactive power component, depending on whether the transfer coil waveform is leading or lagging.

Figure 16:
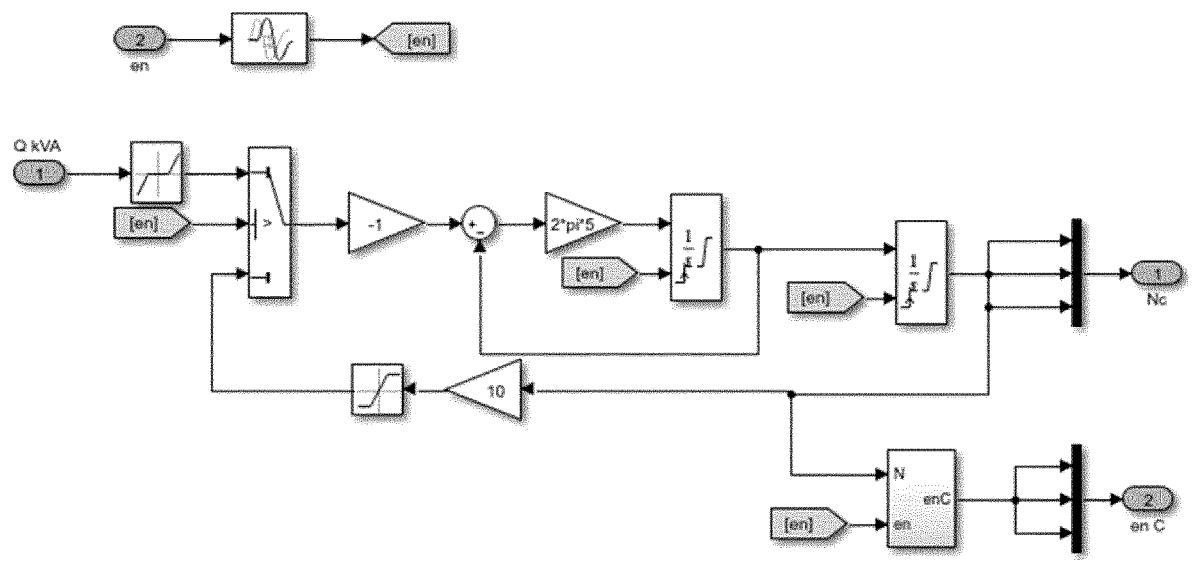
FIG. 16 is a software function block diagram showing a control strategy for power factor control in accordance with some embodiments of the present invention.
Figure 17:
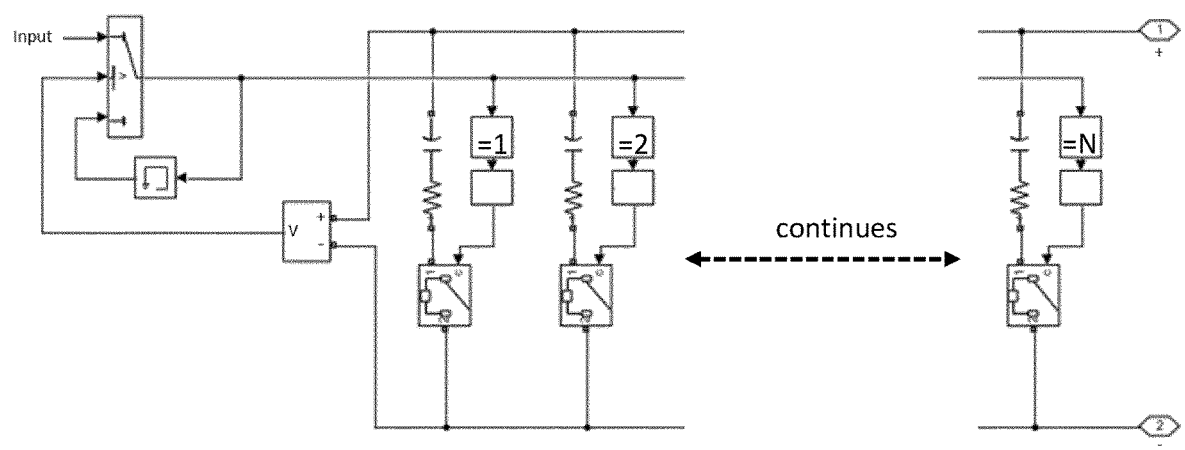
FIG. 17 is a software function block diagram showing a control strategy power electronic transistors to achieve power factor control in accordance with some embodiments of the present invention.

If the electromagnetic core has additional capacitance and inductance which can be changed via a switching mechanism (such as thyristors), one embodiment of the power factor control 106 is shown in FIG. 16. Nested integral control loops are used to determine the error between the reference and actual reactive power. This then outputs a tapping position number, relating to the physical tap position that should be used. This tap position number is used to activate the thyristors as shown for one of the three phases in FIG. 17. The power electronics are operated in parallel to provide a continuous dynamic adjustment of the reactive power through the PWM applied to the control coils.

Figure 22:
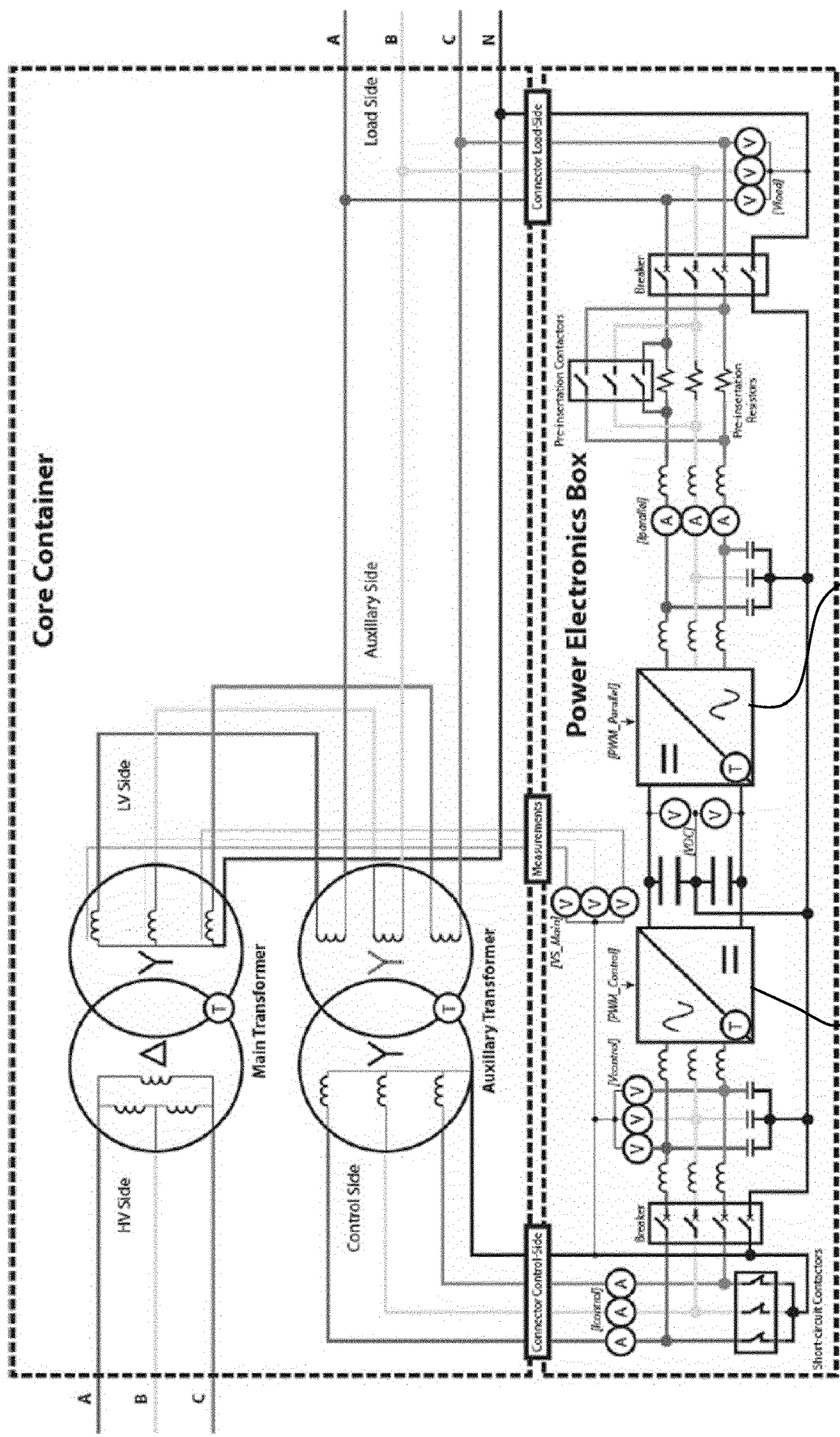
FIG. 22 is a diagram of a three phase transformer apparatus according to a further embodiment of the invention.

A diagram of a three phase transformer apparatus according to an embodiment of the disclosure is shown in FIG. 22. The transformer apparatus may comprise a transformer core 100, for example as described above with reference to FIG. 20. As such, the upper coil for each phase comprises of a primary 20U and secondary coil 22U, and the lower coil consists of a control 24L and secondary coil 22L. For each of the upper and lower coils (coil assemblies) the coils may be wound overlapping each other. The two secondary coils 22U and 22L may be connected in series. As such, each phase may be represented by the circuit diagram representation shown in FIG. 21.

As shown in FIG. 22, the three phase transformer apparatus is configured to transform three phase power on the primary side having a delta configuration to three phase power on the secondary side having a star configuration. In the embodiment of FIG. 22, the control coils are connected in a star configuration for independent phase control. Each of the primary, secondary, and control coils may be connected with either star or delta configuration without deviation from the scope of this invention.

FIG. 22 further depicts the controller, which in the embodiment of FIG. 22 is configured to draw power from the secondary side. Thus, the power electronics of the controller (e.g. the circuitry provided with the "Power electronics box" of FIG. 22, corresponding to the power electronics 104 of FIG. 1 discussed above) is connected between the secondary side of the three phase transformer apparatus and the control coils. As such, the power electronics (e.g. power electronics 104 of FIG. 1) may be isolated from the primary side of the three-phase transformer.

As shown in FIG. 22, the power electronics of the controller comprises an ac to ac converter configured to draw power from the secondary side and to apply a voltage or current waveform to the control coil in order to influence the transfer of energy between the first primary coils and the first and second secondary coils of the three phase transformer apparatus. Thus, the controller may be configured to perform voltage waveform control and power factor control using the power electronics.

In the embodiment of FIG. 22, the ac to ac converter is an asynchronous ac to ac converter. As shown in FIG. 22, the ac to ac converter comprises an ac to dc converter 402 and a dc to ac converter 404. The ac to dc converter 402 is configured to convert ac power from the secondary side to dc power. The dc to ac converter 404 is then configured to convert dc power from the ac to dc converter 402 to ac power, and output the ac power to the control coils. As such, the ac to dc converter 402 and the dc to ac converter 404 are provided in a back-to-back configuration as discussed above. Between the ac to dc converter 402 and the dc to ac converter 404, a dc link is provided. The dc link may be provided to reduce or minimise dc voltage ripple between the two converters. As such, the ac to dc converter and the dc to ac converter form part of a voltage control circuit and a power factor control circuit configured to apply a voltage waveform or a current waveform to the control coil of each phase to control a voltage and a power factor on the secondary side of the transformer apparatus.

In some embodiments, an energy storage circuit as discussed above may be provided as part of FIG. 22. As such, where the power electronics (e.g. power electronics 104 of FIG. 1) is configured to draw power from the secondary side, the energy storage circuit is configured to draw power from the secondary side and to supply stored power to the power electronics and the control coils. The energy storage circuit may thus supply energy to the control coils in order to boost the power available to the control coils for power factor correction and/or voltage waveform correction when insufficient power is available from the secondary side.

While the embodiment of FIG. 22 shows power electronics of a controller connected to the secondary side of the transformer apparatus, it will be appreciated that in other embodiments, the power electronics of FIG. 22 may be connected between the primary side and the control coils. As such, in other embodiments the power electronics may be configured to draw power from the primary side wherein the power electronics is connected between the primary side of the three phase transformer apparatus and the control coils. In particular, where the controller (e.g. the power electronics of the controller) are configured to draw power from the primary side, the energy storage circuit may be configured to draw power from the primary side and to supply stored power to the power electronics and the control coils.

As further shown in FIG. 22, the power electronics (Power Electronics Box) comprises a plurality of circuit breaker circuits. A first circuit breaker circuit is provided for each phase between the ac to dc converter and the power supply for the controller (secondary side in FIG. 22), A second circuit breaker circuit is provided for each phase between the dc to ac converter and the control coils. The first and second circuit breaker circuits are each configured to isolate the respective phase of the controller from windings of the transformer apparatus in the event of excessive current/voltage.

As shown in FIG. 22, pre-insertion resistors are provided between the secondary side and the ac to dc converter. The pre-insertion resistors may be provided to control the current drawn by the ac to dc converter when operational. In some embodiments, a bypass circuit (pre-insertion contactors) may be provided to control whether or not the pre-insertion resistors are used.

Further, the power electronics (of the controller) of FIG. 22 may comprise short a plurality of short circuit contactors, each short circuit contactor connected between a control coil and ground. Thus, for each phase a short circuit contactor is provided which is configured to short circuit the respective control coil. By short circuiting the control coils, the three phase transformer may be operated in bypass mode (i.e. bypass the control coils), where the device acts as a standard transformer with the ratio of the primary/secondary windings on the upper coil assembly.

In the embodiment of FIG. 22, each of the ac to dc and dc to ac converter comprises a filter circuit configured to filter the ac power side of the converter. In the embodiment of FIG. 22, each filter circuit comprises a capacitor and a plurality of inductors (e.g. an LCL filter circuit). Each filter circuit may be configured to reduce high frequency harmonics associated with the respective power converters.

In the embodiment of FIG. 22 the controller may be provided in a controller housing (Power Electronics Box). In some embodiments, the controller housing may comprise a power electronics housing for power electronics. As shown in FIG. 22, the transformer core may be provided in a separate transformer housing, with suitable interconnections (e.g. wires, cables or busbars) between the coils of the transformer core and the controller housing. Connections may also be provided for the voltage sensors which used to measure the voltages on the secondary side/secondary coils.

As shown in FIG. 22, the controller also includes a plurality of voltage sensors and current sensors, configured to sense various voltages/currents associated with the controller. In particular, the controller may be configured to sense the current and voltage on each phase input to the ac to dc converter, and the current and voltage output on each phase by the dc to ac converter (i.e. the current and voltage output to the control coils). The controller may also be configured to sense the dc voltage output by the ad to dc converter.

As shown in FIG. 22, the ac to dc converter and the dc to ac converter may also comprise a temperature sensor. The temperature sensors may each be configured to monitor the respective converter to ensure the converter is operating at a norm temperature.

It will be obvious to those skilled in the art that many different variations on the PWM control algorithm, as well as control methodologies and algorithms can be used to achieve the same effect.

It will be apparent that the electrical power supply system and process described herein are particularly advantageous as they are able to dynamically and rapidly respond to changes in the input energy received by the system in order to generate corresponding output energy having a target voltage and a target input power factor. In particular, this ability allows the described system and process to match the output energy to the energy demanded by the loads on the system. Moreover, the system and process are bi-directional, meaning that they are able to do this for energy supplied from an energy grid and flowing in one direction, for example, and also for energy supplied from renewable energy sources, which may be flowing through the system in the opposite direction. For example, changes in local energy generation arising from changes in wind and/or changes in available sunlight are able to be mitigated by the system and process to provide a relatively constant output for a fixed load.

Many modifications will be apparent to those skilled in the art without departing from the scope of the present invention.

The invention claimed is:

1. A three phase transformer apparatus for a three phase electrical power transformation system, wherein
for each phase of the three phase transformer apparatus the three phase transformer apparatus comprises:
an upper core limb having a first end and a second end;
a lower core limb having a third end and a fourth end;
a first coil assembly comprising a first primary coil and a first secondary coil,
wherein the first primary coil and the first secondary coil of each first coil assembly are wound concentrically around one of the upper core limb or the lower core limb of the respective phase; and
a second coil assembly comprising a second secondary coil and a control coil,
wherein the second secondary coil and the control coil of each second coil assembly are wound concentrically around the other of the upper core limb and the lower core limb of the respective phase;
wherein the second secondary coil of each second coil assembly is connected in series to the first secondary coil of the first coil assembly of the respective phase,
the three phase transformer apparatus further comprising:
a first yoke portion connected between each of the first ends of the upper core limbs;
a second yoke portion connected between each of the fourth ends of the lower core limbs;
at least one transfer yoke, configured to allow magnetic flux to flow between the first end of each upper core limb and the second end of the respective upper core limb, and to allow magnetic flux to flow between the third end of each lower core limb and the fourth end of the respective lower core limb,
a controller connected to the control coil of each phase and configured to apply a voltage or current waveform to the control coil in order to influence the transfer of energy between the first primary coils and the first and second secondary coils of the three phase transformer apparatus,
wherein the controller comprises:
a voltage control circuit connected to the control coil of each of phase and configured to apply a voltage waveform or a current waveform to the control coil of each phase to control a voltage across the first secondary coil and the second secondary coil of each of the phases to control harmonics; and
a power factor control circuit configured to control a power factor of the three phase transformer apparatus
wherein the power factor control circuit of the controller is configured to draw power from the secondary side of the three phase transformer apparatus and to output power to the voltage control circuit via a dc link, wherein the controller is electrically isolated from the primary side of the three phase transformer apparatus.

2. The three phase transformer apparatus according to claim 1, wherein:
the first coil assembly of each phase further comprises an additional control coil,
wherein the first primary coil, the first secondary coil and, the additional control coil of each first coil assembly are wound concentrically around the core limb of the respective phase; and
wherein the control coil and the additional control coil for each phase are wound in opposite directions about the upper core limb and the lower core limb.

3. The three phase transformer apparatus according to claim 2, wherein the first control coil of each phase is connected in series to the additional control coil of the respective phase.

4. The three phase transformer apparatus according to claim 1, wherein:
the second coil assembly of each phase further comprises a second primary coil, wherein the second primary coil, the second secondary coil, and the control coil of each second coil assembly are wound concentrically around the core limb of the respective phase;
wherein the second primary coil of the second coil assembly is connected in series to the first primary coil of the first coil assembly of the respective phase.

5. The three phase transformer apparatus according to claim 1, wherein
the power factor control circuit of the controller comprises a variable reactance for each of the control coils, the power factor control circuit configured to control the reactance connected to each of the control coils in order to control the power factor of the three phase transformer apparatus.

6. The three phase transformer apparatus according to claim 1, wherein
the controller further comprises an energy storage circuit configured to provide a back-up power source for the controller to apply the voltage or current waveform to the control coil.

7. The three phase transformer apparatus according to claim 1, wherein
the upper core limb of each phase and one of the at least one transfer yoke are arranged in a first plane; and/or the lower core limb of each phase and one of the at least one transfer yoke are arranged in a second plane.

8. The three phase transformer apparatus according to claim 1, wherein
the at least one transfer yoke comprises:
a first transfer yoke connected between the second ends of the upper core limbs and configured to allow magnetic flux to flow between the first end of each upper core limb and the second end of the respective upper core limb flux; and
a second transfer yoke connected between the third ends of the lower core limbs and configured to allow magnetic flux to between the third end of each lower core limb and the fourth end of the respective lower core limb.

9. The three phase transformer apparatus according to claim 8, wherein
the first transfer yoke is spatially separated from the second transfer yoke.

10. The three phase transformer apparatus according to claim 1, wherein
for each phase the second end of each upper core limb is connected to the respective third end of the respective lower core limb.

11. The three phase transformer apparatus according to claim 1, further comprising:
an upper flux return path core connected between a second end of an upper core limb and a first end of the respective upper core limb; and/or
a lower flux return path core connected between a fourth end of a lower core limb and a third end of the respective lower core limb.

12. The transformer apparatus according to claim 1, wherein
the at least one transfer yoke comprises:
a first transfer yoke connected between the second end of the upper core limb and the first end of the upper core limb, and configured to allow magnetic flux to flow between the first end of the upper core limb and the second end of the upper core limb flux; and
a second transfer yoke is connected between the fourth end of the lower core limb and the third end of the lower core limb, and configured to allow magnetic flux to between the third end of the lower core limb and the fourth end of the lower core limb.

13. The transformer apparatus according to claim 12, wherein the first transfer yoke is spatially separated from the second transfer yoke.

14. The transformer apparatus according to claim 12, wherein
the upper core limb and one of the at least one transfer yoke are arranged in a first plane; and/or
the lower core limb and one of the at least one transfer yoke are arranged in a second plane.

15. A transformer apparatus for an electrical power transformation system comprising:
an upper core limb having a first end and a second end;
a lower core limb having a third end and a fourth end;
a first coil assembly comprising a first primary coil, and a first secondary coil, wherein the first primary coil and the first secondary coil are wound concentrically around one of the upper core limb or the lower core limb;
a second coil assembly comprising a second secondary coil and a control coil, wherein the second secondary coil and the control coil are wound concentrically around the other of the upper core limb or the lower core limb,
wherein the second secondary coil of the second coil assembly is connected in series to the first secondary coil of the first coil assembly;
at least one transfer yoke portion, configured to allow magnetic flux to flow between the first end of the upper core limb and the second end of the upper core limb, and to allow magnetic flux to flow between the third end of the lower core limb and the fourth end of the lower core limb; and
a controller connected to the control coil and configured to apply a voltage or current waveform to the control coil in order to influence the transfer of energy between the first primary coil and the first and second secondary coils of the transformer apparatus,
wherein the controller comprises:
a voltage control circuit connected to the control coil and configured to apply a voltage waveform or a current waveform to the control coil to control a voltage across the first secondary coil and the second secondary coil to control harmonics; and
a power factor control circuit configured to control a power factor of the transformer apparatus,
wherein the power factor control circuit of the controller is configured to draw power from the secondary side of the transformer apparatus and to output power to the voltage control circuit via a dc link, wherein the controller is electrically isolated from the primary side of the transformer apparatus.

16. The transformer apparatus according to claim 15, wherein
the first coil assembly further comprises an additional control coil,
wherein the first primary coil, the first secondary coil and, the additional control coil of the first coil assembly are wound concentrically around said upper core limb or the lower core limb; and
wherein the control coil and the additional control coil are wound in opposite directions about the upper core limb and the lower core limb.

17. The transformer apparatus according to claim 16, wherein the first control coil is connected in series to the additional control coil.

18. The transformer apparatus according to claim 15, wherein
the second coil assembly further comprises a second primary coil,
wherein the second primary coil, the second secondary coil, and the control coil of each second coil assembly are wound concentrically around the other of the upper or lower core limb;
wherein the second primary coil of the second coil assembly is connected in series to the first primary coil of the first coil assembly.

19. The transformer apparatus according to claim 15, wherein
the power factor control circuit of the controller comprises a variable reactance for the control coil, the power factor control circuit configured to control the reactance connected to the control coil in order to control the power factor of the transformer apparatus.

20. The transformer apparatus according to claim 9, further comprising:

an additional upper flux return path core connected between the second end of the upper core limb and the first end of the upper core limb; and/or an additional lower flux return path core connected between the fourth end of the lower core limb and a third end of the lower core limb.

* * * * *